United States Patent
Zhu et al.

(10) Patent No.: US 9,789,754 B2
(45) Date of Patent: Oct. 17, 2017

(54) DUAL-MOTOR POWER SYSTEM AND DUAL-MOTOR HYBRID POWER SYSTEM FOR VEHICLE

(71) Applicant: SAIC Motor Corporation Limited, Shanghai (CN)

(72) Inventors: Jun Zhu, Shanghai (CN); Hailong Ge, Shanghai (CN); Sidong Luo, Shanghai (CN); Rui Li, Shanghai (CN); Xu Chai, Shanghai (CN); Bin Xu, Shanghai (CN); Zhenxing Fu, Shanghai (CN); Hongxiang Leng, Shanghai (CN); Jian Wang, Shanghai (CN); Jun Sun, Shanghai (CN)

(73) Assignee: SAIC Motor Corporation Limited, Shanghai (CN)

( * ) Notice: Subject to any disclaimer, the term of this patent is extended or adjusted under 35 U.S.C. 154(b) by 169 days.

(21) Appl. No.: 14/838,001

(22) Filed: Aug. 27, 2015

(65) Prior Publication Data

US 2016/0137045 A1     May 19, 2016

(30) Foreign Application Priority Data

Nov. 14, 2014     (CN) .......................... 2014 1 0647496

(51) Int. Cl.
*B60K 6/00* (2006.01)
*B60K 6/08* (2006.01)
(Continued)

(52) U.S. Cl.
CPC .................. *B60K 1/02* (2013.01); *B60K 6/36* (2013.01); *B60K 6/383* (2013.01); *B60K 6/442* (2013.01);
(Continued)

(58) Field of Classification Search
CPC ................................... B60K 6/00; B60K 6/08
See application file for complete search history.

(56) References Cited

U.S. PATENT DOCUMENTS

| 4,584,892 A | 4/1986 | Hiraiwa et al. |
| 5,106,352 A | 4/1992 | Lepelletier |

(Continued)

FOREIGN PATENT DOCUMENTS

| CN | 101875298 A | 11/2010 |
| CN | 102490585 A | 6/2012 |

(Continued)

OTHER PUBLICATIONS

Translation of JP2009107626, printed May 30, 2017.*
(Continued)

*Primary Examiner* — Tisha Lewis
(74) *Attorney, Agent, or Firm* — McDonnell Boehnen Hulbert & Berghoff LLP

(57) ABSTRACT

A dual-motor power system or a dual-motor hybrid power system for a vehicle comprises a first motor, a second motor, an intermediate shaft, a first gear set disposed between a first driving shaft, and an intermediate shaft. The first driving shaft couples with the intermediate shaft via the first gear set, a second gear set disposed between the second driving shaft and the intermediate shaft, and a single synchronizer disposed around the second driving shaft. The synchronizer can be switched between a neutral position, a first-speed-ratio position, and a second-speed-ratio position. In the neutral position, the second driving shaft is decoupled from the first and second gear sets. In the first-speed-ratio position, the synchronizer couples the second driving shaft with the intermediate shaft via the first gear set. In the second-
(Continued)

speed-ratio position, the synchronizer couples the second driving shaft with the intermediate shaft via the second gear set.

19 Claims, 17 Drawing Sheets

(51) Int. Cl.
| | | |
|---|---|---|
| *B60K 1/02* | (2006.01) | |
| *B60K 6/36* | (2007.10) | |
| *B60K 6/383* | (2007.10) | |
| *B60K 6/442* | (2007.10) | |
| *B60K 6/547* | (2007.10) | |
| *B60W 10/08* | (2006.01) | |
| *B60W 10/11* | (2012.01) | |
| *B60W 20/00* | (2016.01) | |
| *F16H 3/00* | (2006.01) | |
| *F16H 37/08* | (2006.01) | |

(52) U.S. Cl.
CPC ............ *B60K 6/547* (2013.01); *B60W 10/08* (2013.01); *B60W 10/11* (2013.01); *B60W 20/00* (2013.01); *F16H 3/006* (2013.01); *F16H 37/0806* (2013.01); *Y02T 10/6234* (2013.01); *Y10S 903/909* (2013.01); *Y10S 903/913* (2013.01); *Y10S 903/919* (2013.01); *Y10S 903/93* (2013.01)

(56) References Cited

U.S. PATENT DOCUMENTS

| | | | |
|---|---|---|---|
| 5,425,283 A | | 6/1995 | Wehking |
| 5,558,595 A | | 9/1996 | Schmidt et al. |
| 5,789,823 A | | 8/1998 | Sherman |
| 6,019,697 A | | 2/2000 | Colletti |
| 6,592,484 B1 | | 7/2003 | Tsai et al. |
| 6,634,247 B2 | * | 10/2003 | Pels .......................... B60K 6/26 477/6 |
| 6,886,424 B2 | | 5/2005 | Janson et al. |
| 7,597,020 B2 | | 10/2009 | Baldwin |
| 7,611,433 B2 | | 11/2009 | Forsyth et al. |
| 7,895,910 B2 | | 3/2011 | Caenazzo et al. |
| 8,109,167 B2 | | 2/2012 | Mohlin et al. |
| 8,333,126 B2 | | 12/2012 | Enstroem et al. |
| 8,444,519 B2 | | 5/2013 | Borntraeger et al. |
| 8,549,959 B2 | | 10/2013 | Kasuya et al. |
| 8,672,109 B2 | | 3/2014 | Quartier et al. |
| 8,672,803 B2 | | 3/2014 | Tamba et al. |
| 8,677,847 B2 | | 3/2014 | Diani et al. |
| 8,689,655 B2 | | 4/2014 | Diani et al. |
| 8,701,808 B2 | * | 4/2014 | Zhu .......................... B60K 6/387 180/65.6 |
| 8,714,287 B2 | | 5/2014 | Kim et al. |
| 8,727,939 B2 | | 5/2014 | Chen et al. |
| 8,763,485 B2 | | 7/2014 | Thomas |
| 8,771,136 B2 | | 7/2014 | Miller et al. |
| 8,784,249 B2 | | 7/2014 | Motodohl et al. |
| 2001/0051556 A1 | | 12/2001 | Takenaka |
| 2004/0251064 A1 | | 12/2004 | Imai |
| 2004/0251862 A1 | | 12/2004 | Imai |
| 2009/0199666 A1 | | 8/2009 | Yang et al. |
| 2010/0276218 A1 | | 11/2010 | Thompson et al. |
| 2010/0311540 A1 | | 12/2010 | Hellenbroich |
| 2011/0239820 A1 | | 10/2011 | Shibahata |
| 2012/0053011 A1 | * | 3/2012 | Onomura ............... B60K 6/383 477/3 |
| 2012/0104904 A1 | | 5/2012 | Abiko et al. |
| 2012/0115674 A1 | * | 5/2012 | Ikegami .................. B60K 6/36 477/3 |
| 2012/0234133 A1 | * | 9/2012 | Ikegami .................. B60K 6/48 74/661 |
| 2013/0184111 A1 | | 7/2013 | Tsuchida et al. |
| 2013/0282220 A1 | | 10/2013 | Tachikawa |
| 2013/0345019 A1 | | 12/2013 | Kaltenbach et al. |
| 2014/0011631 A1 | | 1/2014 | Cimatti |
| 2016/0009269 A1 | | 1/2016 | Zhou et al. |
| 2016/0137048 A1 | | 5/2016 | Zhu et al. |
| 2016/0137049 A1 | | 5/2016 | Zhu et al. |
| 2016/0137188 A1 | | 5/2016 | Zhu et al. |
| 2016/0137189 A1 | | 5/2016 | Zhu et al. |

FOREIGN PATENT DOCUMENTS

| | | |
|---|---|---|
| CN | 103072474 A | 5/2013 |
| CN | 103332100 A | 10/2013 |
| CN | 103552461 A | 2/2014 |
| DE | 102011005451 A1 | 9/2012 |
| EP | 1690723 A2 | 8/2006 |
| EP | 2368739 A1 | 9/2011 |
| JP | 2002-114063 A | 4/2002 |
| JP | 2009107626 A | 5/2009 |
| JP | 2013-108604 A | 6/2013 |
| WO | 2008/138387 A1 | 11/2008 |

OTHER PUBLICATIONS

U.S. Appl. No. 14/948,034, filed Nov. 20, 2015, inventors: Jun Zhu, Chengjie Ma, Zhengmin Gu, Xiajun Ye, Pengjun Zhang, Peng Zhang, and Jing Gu.
U.S. Appl. No. 14/947,979, filed Nov. 20, 2015, inventors: Hongxiang Leng, Wen Li, Jun Sun, Xinhua Jiang, Feifei Zhang, Sidong Luo, and Hailong Ge.
Ioan-Adrian Viorel; et al.; Integrated Starter-Generators for Automotive Applications, ACTA Electrotehnica, vol. 45, No. 3, Sep. 2004, pp. 255-260.
Nate Martinez, Motor Trend Canada, First Drive: 2012 Infiniti M35 Hybrid—Fashionably Late: Infinity Finally RSVPs for Upscale Hybrid Party, Aug. 4, 2010, 18 pages.
Iskra Avtoelektrika d.d.; Integrated Starter Motor Generators; Mar. 2008, 8 pages.
European Patent Office, European Search Report, European Appl. No. 15179430.2, dated Jun. 28, 2016 (10 pages).

* cited by examiner

DUAL-MOTOR POWER SYSTEM AND DUAL-MOTOR HYBRID POWER SYSTEM FOR VEHICLE

CROSS REFERENCE TO RELATED APPLICATIONS

This application claims under 35 U.S.C. §119 the benefit of priority from Chinese Patent Application No. 201410647496.1, filed Nov. 14, 2014. Chinese Patent Application No. 20141067496.1 is incorporated entirely herein by reference.

BACKGROUND

I. Technical Field

The disclosure relates to a dual-motor power system and a dual-motor hybrid power system for a vehicle.

II. Background Art

Current motor power systems for driving new energy vehicles have only simple and limited applications. When a high performance electric vehicle is provided with only a single-speed-ratio (i.e., there is no transmission for speed changing), the vehicle has extremely high requirements on torque and speed capacities of the electric motor, which in turn requires an expensive motor. The motor requirements for a vehicle can be reduced significantly when the vehicle has a transmission with two or more speed ratios; however, it is not easy to meet all requirements during operation of the vehicle using an ordinary transmission. Due to increased popularity and development of electric vehicles, the size and high speed requirements of electric vehicles has increased, but the peak torques and highest speeds of electric motors cannot follow this trend well. In this condition, dual-motor power systems are used, which can achieve combined optimization of power capacity and expense by controlling two motors in combination. In current dual-motor power systems, however, two motors are generally equipped with respective gear sets for transmitting their power to a common output. Such a transmission mechanism is complex, so a compact layout is not easy to be obtained.

OVERVIEW

This application describes several example embodiments, at least some of which pertain to at least one of a transmission for a vehicle, components of a transmission for a vehicle, a dual-motor power system, a dual-motor hybrid power system, components of a dual-motor power system, or components of a dual-motor hybrid power system.

In a first respect, an example embodiment can take the form of a dual-motor power system for a vehicle, the dual-motor power system comprising: (i) a first motor, (ii) a second motor, (iii) a first driving shaft configured to be turned by the first motor, (iv) a second driving shaft configured to be turned by the second motor and disposed to be coaxial with the first driving shaft, (v) an intermediate shaft disposed to be parallel with the first driving shaft and the second driving shaft, (vi) a first gear set disposed between the first driving shaft and the intermediate shaft and having a first speed-reducing ratio, wherein the first gear set couples the first driving shaft with the intermediate shaft, (vii) a second gear set having a second speed-reducing ratio, (viii) a differential driven by the intermediate shaft, and (ix) a synchronizer disposed around the second driving shaft between the first motor and the second motor, wherein the synchronizer is configured to be switched between a neutral position, a first-speed-ratio position, and a second-speed-ratio position, wherein in the neutral position, the second driving shaft is decoupled from the first gear set and the second gear set, wherein in the first-speed-ratio position, the synchronizer couples the second driving shaft with the intermediate shaft via the first gear set, and wherein, in the second-speed-ratio position, the synchronizer couples the second driving shaft with the intermediate shaft via the second gear set.

In another respect, an example embodiment can take the form of a dual-motor hybrid power system for a vehicle, the dual-motor hybrid power system comprising: (i) a first motor including a first driving shaft, (ii) a second motor including a second driving shaft disposed to be coaxial with the first driving shaft, (iii) an engine disposed to be coupled with the second driving shaft via a clutch, (iv) an intermediate shaft disposed to be parallel with the first driving shaft and the second driving shaft, (v) a first gear set disposed between the first driving shaft and the intermediate shaft and having a first speed-reducing ratio, wherein the first gear set couples the first driving shaft with the intermediate shaft, (vi) a second gear set having a second speed-reducing ratio, (vii) a differential driven by the intermediate shaft, and (viii) a synchronizer disposed around the second driving shaft between the first motor and the second motor, wherein the synchronizer is configured to be switched between a neutral position, a first-speed-ratio position, and a second-speed-ratio position, wherein in the neutral position, the second driving shaft is decoupled from the first gear set and the second gear set, wherein in the first-speed-ratio position, the synchronizer couples the second driving shaft with the intermediate shaft via the first gear set, and wherein, in the second-speed-ratio position, the synchronizer couples the second driving shaft with the intermediate shaft via the second gear set.

In yet another respect, an example embodiment can take the form of a transmission for use in a dual-motor power system, the transmission comprising: (i) a first driving shaft configured to be turned by a first motor, (ii) a second driving shaft configured to be turned by a second motor and disposed to be coaxial with the first driving shaft, (iii) an intermediate shaft disposed to be parallel with the first driving shaft and the second driving shaft, (iv) a first gear set disposed between the first driving shaft and the intermediate shaft and having a first speed-reducing ratio, wherein the first gear set couples the first driving shaft with the intermediate shaft, (v) a second gear set having a second speed-reducing ratio, (vi) a differential driven by the intermediate shaft, and (vii) a synchronizer disposed around the second driving shaft between the first motor and the second motor, wherein the synchronizer is configured to be switched between a neutral position, a first-speed-ratio position, and a second-speed-ratio position, wherein in the neutral position, the second driving shaft is decoupled from the first gear set and the second gear set, wherein in the first-speed-ratio position, the synchronizer couples the second driving shaft with the intermediate shaft via the first gear set, and wherein, in the second-speed-ratio position, the synchronizer couples the second driving shaft with the intermediate shaft via the second gear set.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

I. Introduction

Figure 1:
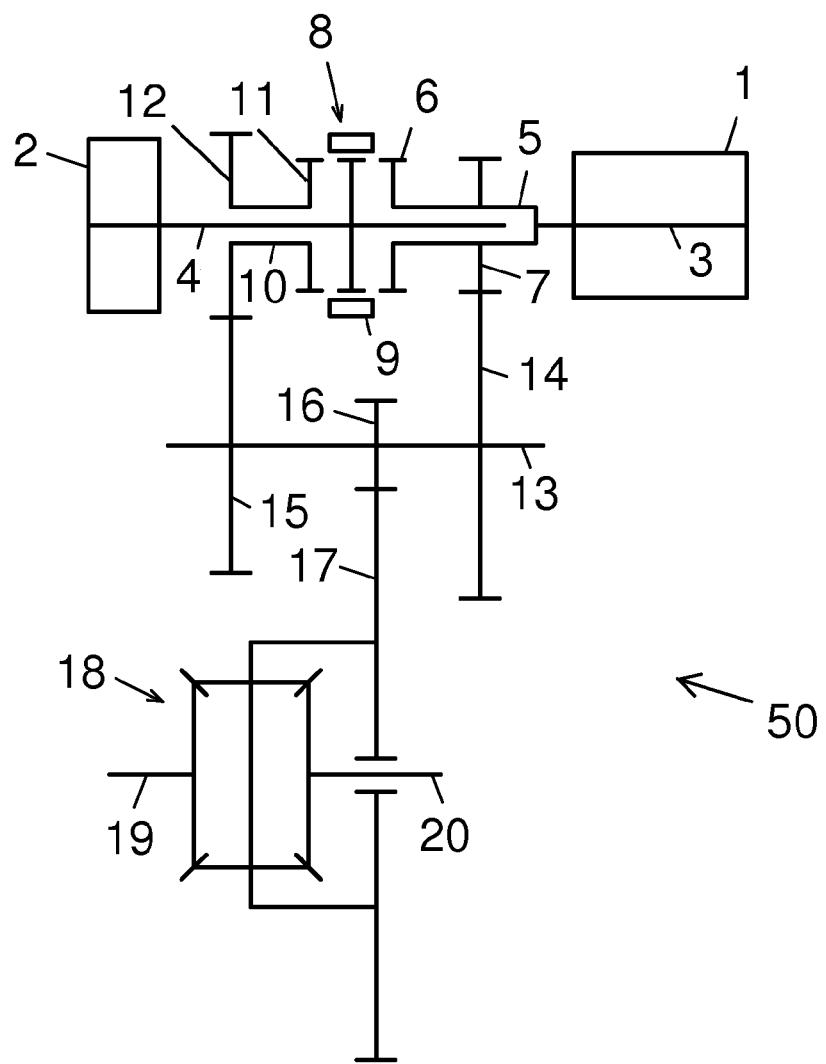
FIG. 1 is a schematic view showing the structure of a dual-motor power system for a vehicle according to an embodiment of the disclosure.

In view of the problems stated above, this disclosure describes example embodiments directed to a dual-motor power system and a dual-motor hybrid power system for a vehicle, the transmission mechanisms of which have improved layouts.

In one respect, the example embodiments are directed to a dual-motor power system for a vehicle that includes a first motor having a first driving shaft; a second motor having a second driving shaft disposed to be coaxial with the first driving shaft; an intermediate shaft disposed to be parallel with the first and second driving shafts; a differential driven by the intermediate shaft; a first gear set disposed between the first driving shaft and the intermediate shaft and having a first speed reducing ratio, the first driving shaft couples with the intermediate shaft via the first gear set; a second gear set disposed between the second driving shaft and the intermediate shaft and having a second speed reducing ratio; and a single synchronizer disposed around the second driving shaft between the first and the second motor in an axial direction. The synchronizer can be configured to be switched between a neutral position, a first-speed-ratio position and a second-speed-ratio position. In the neutral position, the second driving shaft is decoupled from the first and second gear sets. In the first-speed-ratio position, the synchronizer couples the second driving shaft with the intermediate shaft via the first gear set. In the second-speed-ratio position, the synchronizer couples the second driving shaft with the intermediate shaft via the second gear set.

A person having ordinary skill in the art will understand that a gear set (e.g., the first gear set) disposed between two shafts (e.g., the first driving shaft and the intermediate shaft) can mean that the gear set is kinetically between the two shafts, functionally between the two shafts, or the like.

In another respect, the example embodiments are directed to a dual-motor hybrid power system for a vehicle that includes a first motor having a first driving shaft; a second motor having a second driving shaft disposed to be coaxial with the first driving shaft; the engine disposed to be coupled with the second driving shaft via a clutch; an intermediate shaft disposed to be parallel with the first and second driving shafts; a differential driven by the intermediate shaft; a first gear set disposed between the first driving shaft and the intermediate shaft and having a first speed reducing ratio, the first driving shaft couples with the intermediate shaft via the first gear set; a second gear set disposed between the second driving shaft and the intermediate shaft and having a second speed reducing ratio; and a single synchronizer disposed around the second driving shaft between the first and the second motor in an axial direction. Unless the context of the examples dictates otherwise, "driven" can include one or more of "directly driven" and "indirectly driven." With regard to the differential, the intermediate shaft can indirectly drive the differential. In another respect, a gearwheel that is disposed on the intermediate shaft and that meshes with a gearwheel on the differential can directly drive the differential. The synchronizer can be configured to be switched between a neutral position, a first-speed-ratio position and a second-speed-ratio position. In the neutral position, the second driving shaft is decoupled from the first and second gear sets. In the first-speed-ratio position, the synchronizer couples the second driving shaft with the intermediate shaft via the first gear set. In the second-speed-ratio position, the synchronizer couples the second driving shaft with the intermediate shaft via the second gear set.

In yet another respect concerning the example embodiments, the power systems can include a transmission sleeve fixed to the first driving shaft. A tip end of the second driving shaft can be inserted into the transmission sleeve and can be rotatably supported by the transmission sleeve.

In yet another respect concerning the example embodiments, the first gear set can include a first-gear-ratio drive gearwheel fixedly carried by the transmission sleeve and a first-gear-ratio driven gearwheel fixed to the intermediate shaft and meshed with the first-gear-ratio drive gearwheel. Furthermore, the second gear set can include a second-gear-ratio drive gearwheel carried by and being rotatable relative to the second driving shaft and a second-gear-ratio driven gearwheel mounted to the intermediate shaft and meshed with the second-gear-ratio drive gearwheel.

In yet another respect concerning the example embodiments, the synchronizer can include (i) an engaging sleeve carried by the second driving shaft, (ii) a first engagement portion provided on the transmission sleeve, and (iii) a second engagement portion carried by and being rotatable relative to the second driving shaft. The engaging sleeve can be displaced in axial directions along the second driving shaft. The second engagement portion can be connected with the second-gear-ratio drive gearwheel. When the synchronizer is in the neutral position, the engaging sleeve is disengaged from the first and the second engagement portions. When the synchronizer is in the first-speed-ratio position, the engaging sleeve is engaged with the first engagement portion, and is disengaged from the second engagement portion. When the synchronizer is in the second-speed-ratio position, the engaging sleeve is engaged with the second engagement portion, and is disengaged from the first engagement portion.

In yet another respect concerning the example embodiments, the second engagement portion and the second-gear-ratio drive gearwheel can be fixed to opposite ends of a supporting sleeve respectively. This supporting sleeve can be carried by, and can be rotatable relative to, the second driving shaft.

In yet another respect concerning the example embodiments, the transmission sleeve can include a main body having a cylindrical shape and having a central axis coinciding with that of the first driving shaft. The transmission sleeve can include a first end which is fixed to a tip end of the first driving shaft and an opened second end which is provided with the first engagement portion on its outer periphery. The second driving shaft can be inserted into the transmission sleeve from the second end of the transmission sleeve.

In yet another respect concerning the example embodiments, the first speed reducing ratio can be greater than the second speed reducing ratio.

In yet another respect concerning the example embodiments, the first electric motor can be configured as a main motor for continuously providing driving power to the vehicle, and the second electric motor can be configured as an assistant motor to be used when an assistant driving power is needed.

In yet another respect concerning the example embodiments, the second motor can be an integrated starter and generator configured to provide one or more of the following three functions: to provide assistant driving power to the vehicle, to act as a starter of the engine, and to generate electricity in a regenerative braking system of the vehicle.

In yet another respect concerning the example embodiments, the power systems can include a one-way clutch disposed between the first electric motor and the second electric motor for kinematically coupling and decoupling the first electric motor with/from the second electric motor.

In yet another respect concerning the example embodiments, the one-way clutch can be disposed between the transmission sleeve and the second driving shaft. The one-way clutch can be orientated in a way that allows, during the forward driving of the vehicle, the rotation speed of the transmission sleeve to be greater than that of the second driving shaft, but does not allow the rotation speed of the second driving shaft to be greater than that of the transmission sleeve. In this way, the torque of the second driving shaft in the forward direction can be transmitted to the transmission sleeve, while the torque of the transmission sleeve in the forward direction cannot be transmitted to the second driving shaft. The power of the second electric motor or the powers of the second electric motor and the engine can be put into use by means of the one-way clutch when the vehicle is driven forward by the first electric motor and the synchronizer is kept in the neutral position. This use of power or powers can include the second electric motor (or the second electric motor and the engine) and the first electric motor driving the vehicle without displacing the synchronizer. In a case in which the first electric motor is not driving the vehicle, the first electric motor may be used for recovering vehicle braking energy.

In yet another respect concerning the example embodiments, the one-way clutch can be disposed between the transmission sleeve and the first driving shaft. The one-way clutch can be orientated in a way that allows, during the forward driving of the vehicle, the rotation speed of the transmission sleeve to be greater than that of the second driving shaft, but does not allow the rotation speed of the second driving shaft to be greater than that of the transmission sleeve. In this way, the torque of the second driving shaft in the forward direction can be transmitted to the transmission sleeve, while the torque of the transmission sleeve in the forward direction cannot be transmitted to the second driving shaft. The power of the first electric motor can be put into use by means of the one-way clutch when the vehicle is driven forward by the second electric motor or by the second electric motor and the engine. In a case in which the second electric motor is not driving the vehicle, the second electric motor may be used for recovering vehicle braking energy.

In yet another respect concerning the example embodiments, in a dual-motor power system or a dual-motor hybrid power system, the first and second electric motors can share the first gear set (having a first gear ratio), so that the structure of the whole system is simplified, and thus the overall size and cost of the system can be reduced.

In yet another respect concerning the example embodiments, during gear shifting, the speed of the motor on each side of a single synchronizer can be adjusted actively, such that the speed of the component to be engaged by the synchronizer can match or substantially match (e.g., become very approximate to) the speed of the synchronizer, which facilitates gear shifting.

In yet another respect concerning the example embodiments, in which a transmission sleeve is used, the driving shafts of the first and second electric motors can be supported by each other, so that the structural strengths and transmission precisions of the two driving shafts can be improved. Supporting a driving shaft can prevent or reduce the driving shaft from being oblique and can prevent or reduce vibration of the driving shaft during operation of the transmission that includes the driving shaft. Supporting the driving shaft can prevent or reduce slippage of the transmission sleeve engaging the driving shaft such that rotation of the driving shaft can be more precisely transmitted to another driving shaft engaged with or fixed to the transmission sleeve.

In yet another respect concerning the example embodiments in which the first electric motor is used as a main motor for continuously providing power to the vehicle, the example embodiments can easily achieve gear shifting without power interruption.

In this description, the articles "a," "an" or "the" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. Furthermore, an element in the claims may refer to an ordinal number that differs from an ordinal number which that element was referred to in the description. Furthermore still, an element identified in the description using an ordinal number can be referred to without use of that or any other ordinal number.

II. Example Structure and Operation

Some example embodiments of the disclosure are now described with reference to the drawings.

FIG. 1 shows a dual-motor power system 50 for a vehicle according to an example embodiment of the disclosure. A power source of the dual-motor power system 50 can include a first electric motor 1 and a second electric motor 2. The first electric motor 1 can include a first driving shaft 3, and the second electric motor 2 can include a second driving shaft 4. The first driving shaft 3 and the second driving shaft 4 can be disposed coaxially and extending towards each other. In this way, it can be said the first electric motor 1 and the second electric motor 2 are facing toward each other. The term "driving shaft" used here can include either a shaft of a corresponding motor or a combination of the shaft of the corresponding motor and a rotary shaft connected thereto. Any "driving shaft" described herein can be referred to as a "drive shaft." For simplicity, the first electric motor 1 can be referred to as the "first motor," and the second electric motor 2 can be referred to as the "second motor."

Figure 2:
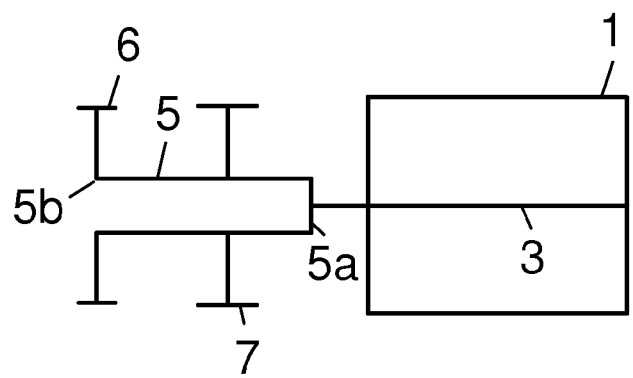
FIG. 2 is a schematic view showing a first motor and a transmission sleeve carried by an output shaft of the first motor of the dual-motor power system.

As shown in FIG. 1 and with reference to FIG. 2, a transmission sleeve 5 is fixed to a tip end (the left end in the Figures) of the first driving shaft 3. The transmission sleeve 5 and first driving shaft 3 can comprise a single integrated component. Alternatively, the transmission sleeve 5 can comprise one or more components and the first driving shaft 3 can comprise one or more other components distinct from any component of the transmission sleeve 5. The transmission sleeve 5 can include a main body of substantially hollow cylinder, having a central axis coinciding with a central axis of the first driving shaft 3. An inner periphery of the transmission sleeve 5 can define a perimeter of the hollow cylinder. The transmission sleeve 5 can include a first end 5a (the right end in FIG. 2) and a second end 5b (the left end in FIG. 2) opposite the first end 5a. The first end 5a can be fixed to the tip end of the first driving shaft 3. The second end 5b can be open to the outside. A first engagement portion 6 can be positioned around an outer periphery of the sleeve 5 at the second end 5b. The first driving shaft 3 includes an opposing end, opposite the tip end of the first driving shaft 3, positioned within the first electric motor 1.

The dual-motor power system 50 includes a first-gear-ratio drive gearwheel 7 that is fixedly carried on an outer periphery of the transmission sleeve 5. In the illustrated embodiment, the first-gear-ratio drive gearwheel 7 is disposed between the first end 5a and the second end 5b in the axial direction (e.g., away from the first end 5a and away second end 5b). In an alternative embodiment, the first-gear-ratio drive gearwheel 7 may be disposed on the sleeve 5 near the first end 5a.

The second driving shaft 4 can include a tip end (the right end in FIG. 1) which is inserted into the transmission sleeve 5 through an opening of the second end 5b. The second driving shaft 4 and the tip end thereof is rotatably supported by the transmission sleeve 5, that is to say, the second driving shaft 4 and the transmission sleeve 5 can rotate relative to each other. For this purpose, a corresponding bearing for the second driving shaft 4 may be provided in the transmission sleeve 5. The second driving shaft 4 includes an opposing end, opposite the tip end of the second driving shaft 4, positioned within the second electric motor 2.

An engaging sleeve 9 is carried by the second driving shaft 4 in a manner that the engaging sleeve 9 is able to move in dual axial directions on the second driving shaft 4. Those axial directions include an axial direction towards the first engagement portion 6 and an axial direction towards a second engagement portion 11.

A supporting sleeve 10 is provided around the second driving shaft 4 between a main body of the second electric motor 2 and the engaging sleeve 9. The supporting sleeve 10 is rotatable with respect to the second driving shaft 4, but cannot move axially with respect to the second driving shaft 4. A first end (the end proximal to the engaging sleeve 9) of the supporting sleeve 10 is provided with the second engagement portion 11, and a second-gear-ratio drive gearwheel 12 is fixedly carried by a second end (the end proximal to the main body of the second electric motor 2) of the supporting sleeve 10. The second-gear-ratio drive gearwheel can be positioned on other portions of the supporting sleeve 10, such as positions between the first and second ends of the supporting sleeve 10.

A relative position between the second engagement portion 11 and the engaging sleeve 9 as well as an axial positional relation between the second driving shaft 4 and the first driving shaft 3 are set in a manner that the first engagement portion 6 and the second engagement portion 11 are disposed on opposite axial sides of the engaging sleeve 9. Axial movement of the engaging sleeve 9 towards the first engagement portion 6 can result in engagement of the engaging sleeve 9 and the first engagement portion 6. When the engaging sleeve 9 is engaged with the first engagement portion 6, the engaging sleeve 9 is disengaged from the second engagement portion 11. Axial movement of the engaging sleeve 9 away from the first engagement portion 6 towards the second engagement portion 11 can result in the synchronizer 8 being in a neutral position. When the engaging sleeve 9 is engaged with the second engagement portion 11, the engaging sleeve 9 is disengaged from the first engagement portion 6.

Further axial movement of the engaging sleeve 9 from the neutral position of the synchronizer 8 towards the second engagement portion 11 can result in engagement of the engaging sleeve 9 and second engagement portion 11. Axial movement of the engaging sleeve 9 away from the second engagement portion 11 towards the first engagement portion 6 can result in the synchronizer 8 being in a neutral position.

The dual-motor power system 50 includes a synchronizer 8. The synchronizer 8 can include the engaging sleeve 9, the first engagement portion 6, and the second engagement portion 11. The synchronizer 8 can include other component(s) well known in the art of synchronizers. The synchronizer 8 is the only synchronizer used in the dual-motor power system 50, by means of which, switching between power transmission paths of the dual-motor power system can be achieved. The synchronizer 8 can comprise a typical structure known in the art. For example, among others, the first engagement portion 6 and the second engagement portion 11 may be in the form of gear rings, and engaging rings may be arranged between the engaging sleeve 9 and the first engagement portion 6 and second engagement portion 11.

The dual-motor power system 50 further includes an intermediate shaft 13, which is arranged to be parallel with the first driving shaft 3 and the second driving shaft 4.

A first-gear-ratio driven gearwheel 14 and a second-gear-ratio driven gearwheel 15 are fixed to the intermediate shaft 13 and are meshed with the first-gear-ratio drive gearwheel 7 and the second-gear-ratio drive gearwheel 12 respectively. A first gear ratio (e.g., a first speed reducing ratio) is provided by the first-gear-ratio drive gearwheel 7 and the first-gear-ratio driven gearwheel 14, and a second gear ratio (e.g., a second speed reducing ratio) is provided by the second-gear-ratio drive gearwheel 12 and the second-gear-ratio driven gearwheel 15. According to an example embodiment, the first gear ratio is greater than the second gear ratio. In perhaps less preferable embodiments, the first gear ratio can be less than the second gear ratio. As used in this description, a gear ratio is a speed ratio and a speed ratio is a gear ratio. A gear ratio can be a gear reducing ratio. A speed ratio can be a speed reducing ratio. In perhaps less preferable example embodiments, a gear ratio may be a gear increasing ratio and the speed ratio may be a speed increasing ratio.

Further, an output drive gearwheel 16 is carried by the intermediate shaft 13. The output drive gear wheel 16 can be positioned on the intermediate shaft 13 between the firstgear-ratio driven gearwheel 14 and the second-gear-ratio driven gearwheel 15. Alternatively, the output drive gear wheel 16 can be positioned to either the left or right of both the first-gear-ratio driven gearwheel 14 and the second-gear-ratio driven gearwheel 15 (i.e., not between the first-gear-ratio driven gearwheel 14 and the second-gear-ratio driven gearwheel 15). The output drive gearwheel 16 meshes with an output driven gearwheel 17.

The dual-motor power system 50 includes a differential 18. The differential 18 includes an input end and an output end. The output driven gearwheel 17 forms or is part of the input end of the differential 18. The differential 18 includes an output shaft 19 and an output shaft 20. The output shaft 19 and the output shaft 20 form or are part of the output end of the differential 18.

The components described above for transmitting power from the first driving shaft 3 and the second driving shaft 4 to the output shafts 19, 20 of the differential 18 form a transmitting mechanism of the dual-motor power system 50.

A first gear set (e.g., the first-gear-ratio drive gearwheel 7 and the first-gear-ratio driven gearwheel 14) can kinematically couple the first electric motor 1 with the intermediate shaft 13 in the first gear ratio. The second electric motor 2 can kinematically couple with the intermediate shaft 13 selectively in the first gear ratio via the first gear set or in the second gear ratio via a second gear set (the second-gear-ratio drive gearwheel 12 and the second-gear-ratio driven gearwheel 15). The first electric motor 1 and the second electric motor 2 share the first gear set, so the dual-motor power system 50 does not need to include a separate gear set for achieving the first gear ratio of the second electric motor 2. In this way, the dual-motor power system 50 may have a simplified structure, and the dual-motor power system 50 may have a reduced size and total cost.

The second driving shaft 4 can include a proximal portion (proximal to the main body of the second electric motor 2) and a distal portion (distal to the main body of the second electric motor 2). The proximal portion and distal portion of the second driving shaft 4 are positioned outside of the main body of the electric motor 2. The distal portion of the second driving shaft 4, with respect to the proximal portion of the second driving shaft 4, is proximate to the first driving shaft 3. In FIG. 1, the proximal portion of the second driving shaft 4 is to the left of the distal portion of the second driving shaft 4. The second driving shaft 4 can be supported at the proximal portion of the second driving shaft 4 by the second-gear-ratio drive gearwheel 12 and the second-gear-ratio driven gearwheel 15.

In accordance with a first example arrangement, the second driving shaft 4 can be supported at the distal portion of the second driving shaft 4 by the transmission sleeve 5. In accordance with a second example arrangement, the distal portion of the second driving shaft 4 can be cantilevered. Supporting the second driving shaft 4 by the transmission sleeve 5 can significantly increase the structural rigidity of the second driving shaft 4, which can improve the transmission precision of the second driving shaft 4. Additionally, the second driving shaft 4 can provide support to the first driving shaft 3. Thus, by using the transmission sleeve 5 to support the second driving shaft 4, the first driving shaft 3 and the second driving shaft 4 can support each other to improve the strengths and transmission precisions of the first driving shaft 3 and the second driving shaft 4.

Figure 3:
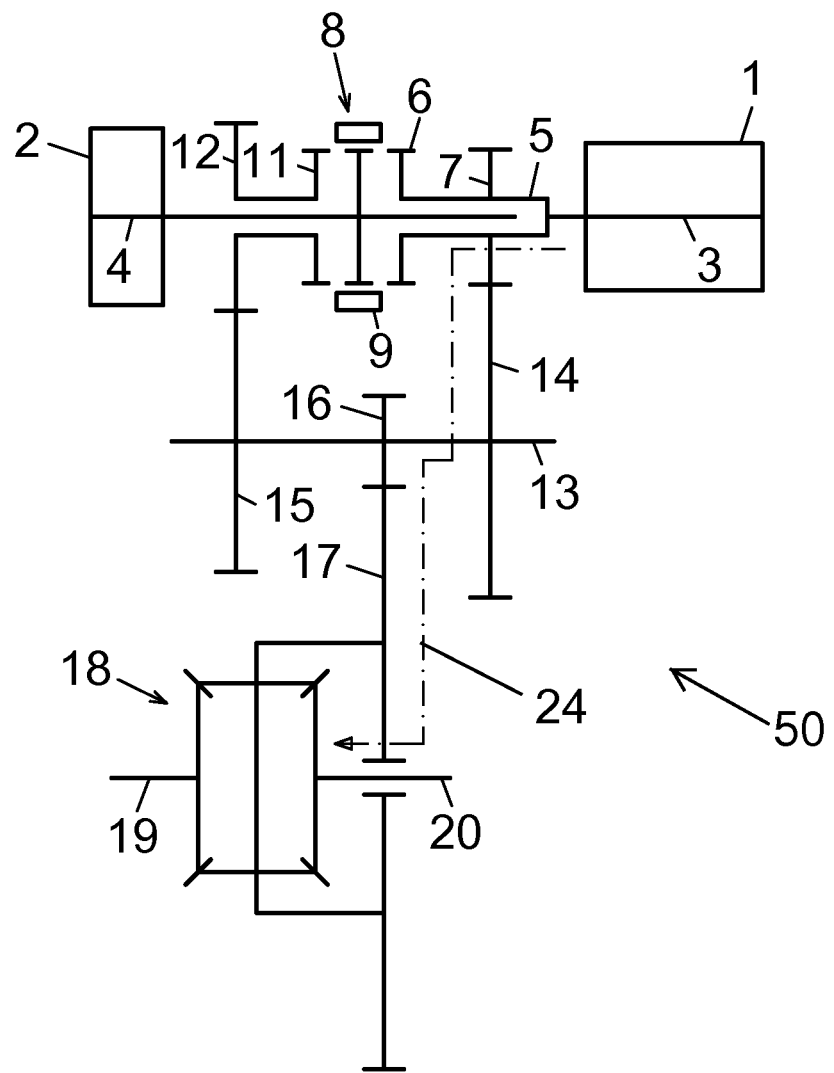
FIG. 3 is a schematic view showing a power transmission path of the first motor of the dual-motor power system.

Next, FIG. 3 shows, by dotted dash lines, the dual-motor power system 50 can include a first-motor power transmission path 24. For this power transmission path, the output power of the first electric motor 1 is transmitted through the first driving shaft 3, the transmission sleeve 5, the first-gear-ratio drive gearwheel 7, the first-gear-ratio driven gearwheel 14, the intermediate shaft 13, the output drive gearwheel 16, and the output driven gearwheel 17 to the differential 18, and can be output to vehicle wheels by the output shafts 19, 20 of the differential 18. The output power of the first electric motor 1 is transmitted only in the first-speed-ratio through the first-motor power transmission path 24. FIG. 3 also shows that the engaging sleeve 9 of the synchronizer 8 may be in a position (neutral position) such that the engaging sleeve and the synchronizer 8 are not engaged with either of the first engagement portion 6 and the second engagement portion 11. In this way, the second electric motor 2 is in a neutral speed ratio state.

Figure 4:
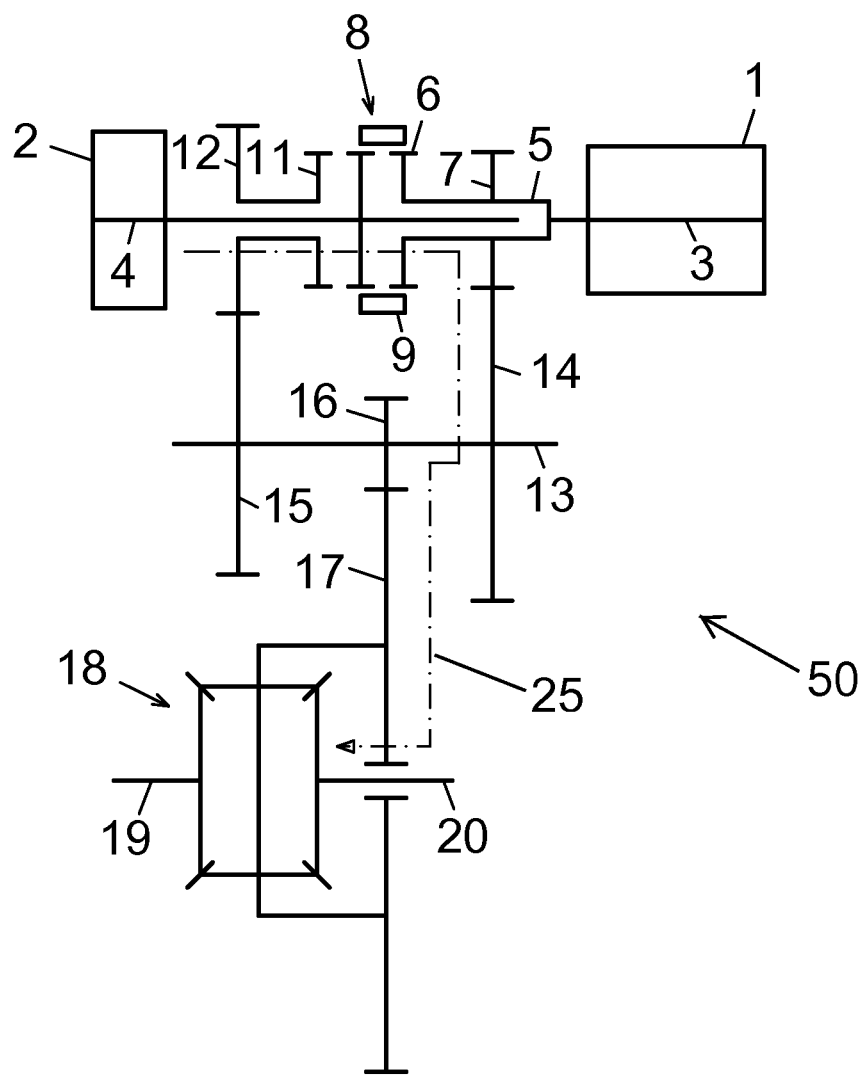
FIG. 4 is a schematic view showing a power transmission path in a first speed ratio of a second motor of the dual-motor power system.

Next, FIG. 4 shows, by dotted dash lines, the dual-motor power system 50 can include a second-motor first-speed-ratio power transmission path 25. For this power transmission path, the engaging sleeve 9 of the synchronizer 8 is displaced towards the first engagement portion 6 and engaged with the first engagement portion 6 (i.e., the synchronizer 8 can be switched into the first-speed-ratio position), so that the second driving shaft 4 is coupled with the transmission sleeve 5. Now the output power of the second electric motor 2 is transmitted through the second driving shaft 4, the synchronizer 8, the transmission sleeve 5, the first-gear-ratio drive gearwheel 7, the first-gear-ratio driven gearwheel 14, the intermediate shaft 13, the output drive gearwheel 16 and the output driven gearwheel 17 to the differential 18, and is then output to the vehicle wheels by the output shafts 19, 20 of the differential 18.

Figure 5:
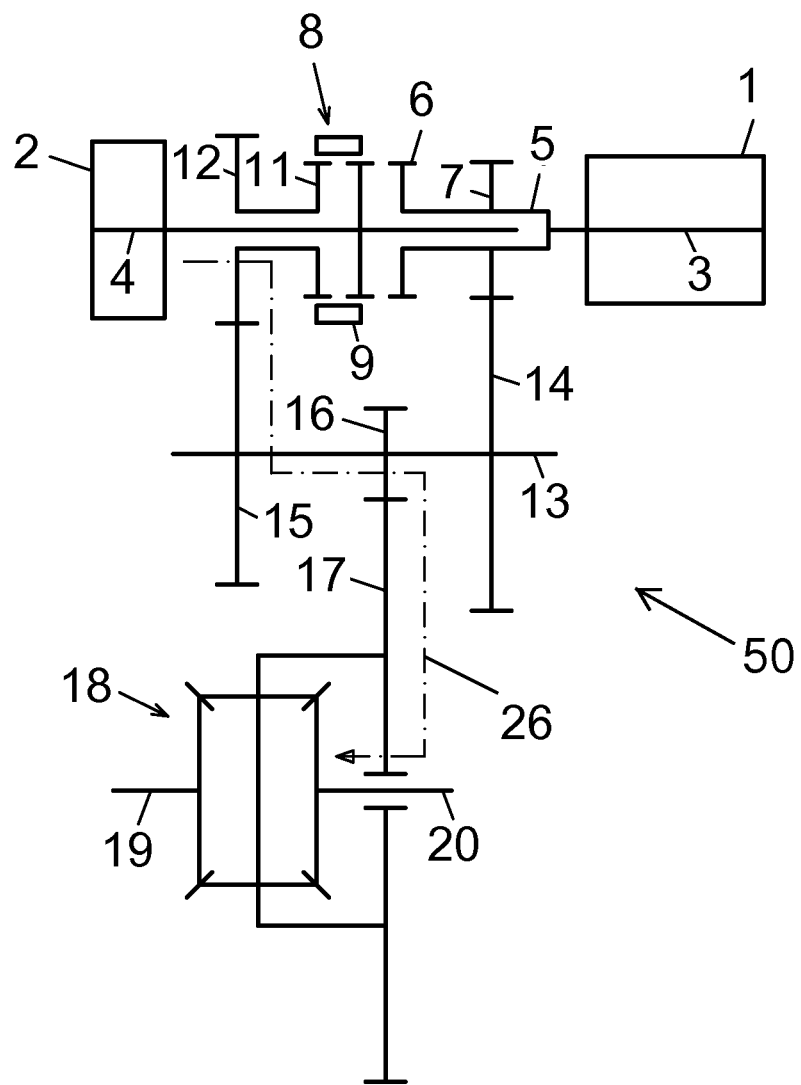
FIG. 5 is a schematic view showing a power transmission path in a second gear ratio of the second motor of the dual-motor power system.

Next, FIG. 5 shows, by dotted dash lines, the dual-motor power system 50 can include a second-motor second-speed-ratio power transmission path 26. For this power transmission path, the engaging sleeve 9 of the synchronizer 8 is displaced towards the second engagement portion 11 and is engaged with the second engagement portion 11 (e.g., the synchronizer 8 can be switched into the second-speed-ratio position), so that the second driving shaft 4 is coupled with the second-gear-ratio drive gearwheel 12. For the second-motor second-speed-ratio power transmission path 26, the output power of the second electric motor 2 is transmitted through the second driving shaft 4, the synchronizer 8, the second-gear-ratio drive gearwheel 12, the second-gear-ratio driven gearwheel 15, the intermediate shaft 13, the output drive gearwheel 16 and the output driven gearwheel 17 to the differential 18, and is then output to the vehicle wheels by the output shafts 19, 20 of the differential 18.

In accordance with an example embodiment, the first electric motor 1 and the second electric motor 2 may be put into operation independent of each other. In this way, the first electric motor 1 is able to drive the vehicle wheels through the first-motor power transmission path 24. And the second electric motor 2 is able to drive the vehicle wheels selectively through the second-motor first-speed-ratio power transmission path 25 or the second-motor second-speed-ratio power transmission path 26.

Figure 6:
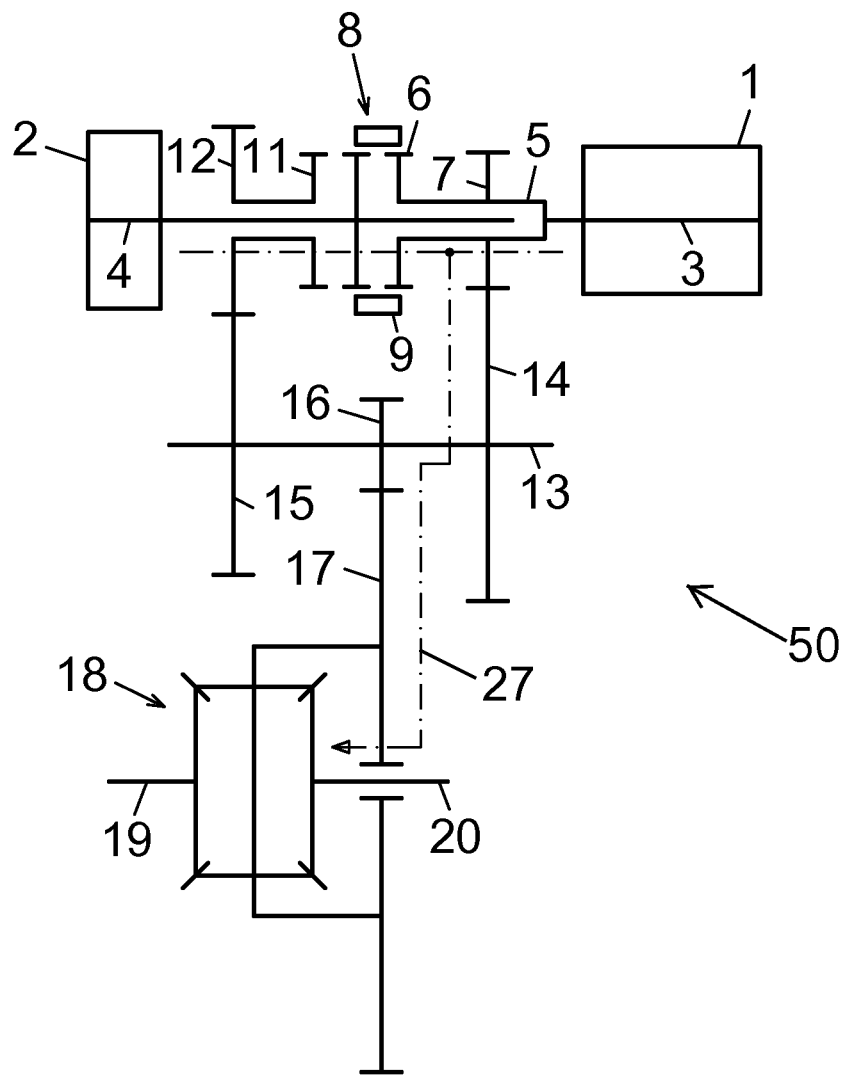
FIGS. 6 and 7 are schematic views showing combined power transmission paths of the two motors of the dual-motor power system.

Next, FIG. 6 shows, by dotted dash lines, the dual-motor power system 50 can include a first-motor combined with second-motor in first-speed-ratio power transmission path 27. For this power transmission path, the first electric motor 1 and the second electric motor 2 are put into operation in combination. Furthermore, for this power transmission path, the engaging sleeve 9 of the synchronizer 8 is engaged with the first engagement portion 6, the output power of the first electric motor 1 is transmitted from the first driving shaft 3 to the transmission sleeve 5, and the output power of the second electric motor 2 is transmitted through the second driving shaft 4 and the synchronizer 8 to the transmission sleeve 5. The output powers of the first electric motor 1 and the second electric motor 2 are combined at the transmission sleeve 5, then the combined output power is transmitted in the first gear ratio, i.e., through the first-gear-ratio drive gearwheel 7 and the first-gear-ratio driven gearwheel 14, to the intermediate shaft 13, the output drive gearwheel 16 and the output driven gearwheel 17 to the differential 18, and is then output to the vehicle wheels by the output shafts 19, 20 of the differential 18.

Figure 7:
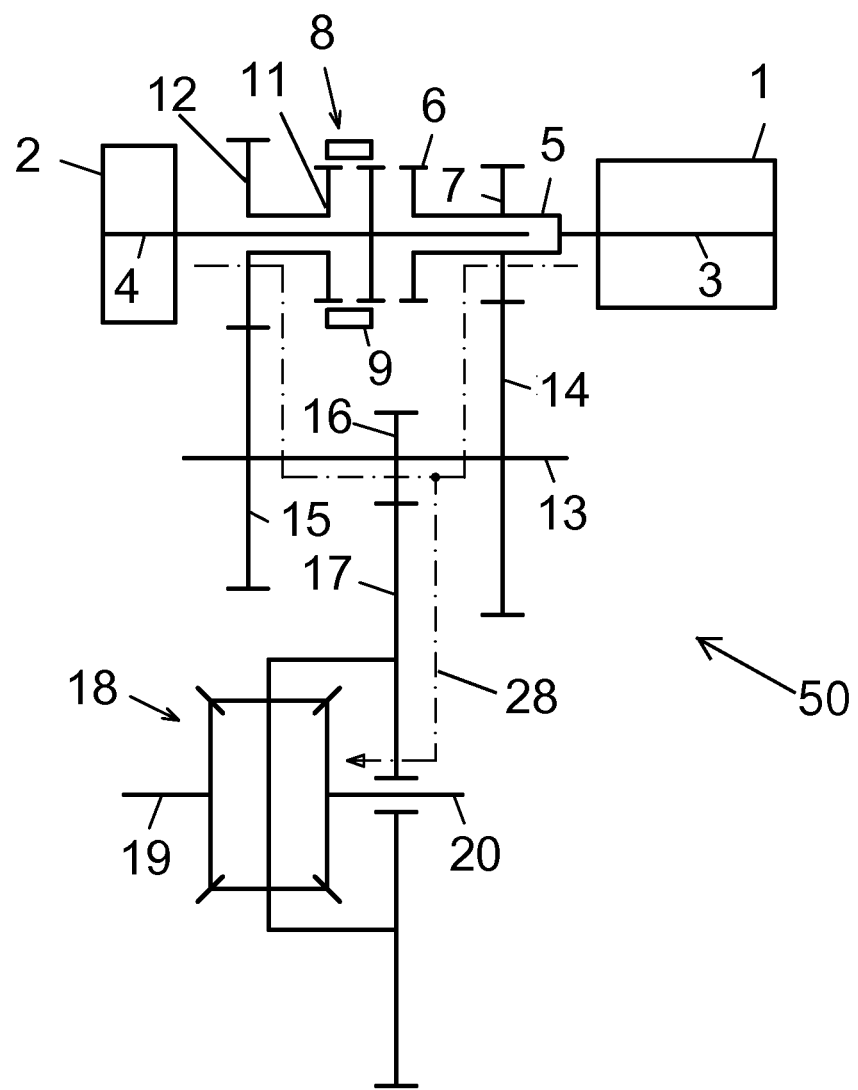

Next, FIG. 7 shows, by dotted dash lines, the dual-motor power system 50 can include a first-motor combined with second-motor in second-speed-ratio power transmission path 28. For this power transmission path, the first electric motor 1 and the second electric motor 2 are put into operation in combination. Furthermore, for this power transmission path, the engaging sleeve 9 of the synchronizer 8 is engaged with the second engagement portion 11, the output power of the first electric motor 1 is transmitted in the first gear ratio through the first driving shaft 3, the transmission sleeve 5, the first-gear-ratio drive gearwheel 7, and the first-gear-ratio driven gearwheel 14 to the intermediate shaft 13, and the output power of the second electric motor 2 is transmitted in the second gear ratio through the second driving shaft 4, the synchronizer 8, the second-gear-ratio drive gearwheel 12, the second-gear-ratio driven gearwheel 15 to the intermediate shaft 13. The output powers of the first electric motor 1 and the second electric motor 2 are combined at the intermediate shaft 13, and the combined output power is transmitted through the output drive gearwheel 16 and the output driven gearwheel 17 to the differential 18, and is then output to the vehicle wheels by the output shafts 19, 20 of the differential 18.

As shown in FIG. 6 and in FIG. 7, the first electric motor 1 and the second electric motor 2 can be put into operation in combination. The example embodiments with combined operation of the first electric motor 1 and the second electric motor 2 allow for the two motors to have different functions. For example, in some example embodiments, the first electric motor 1 can act as a main motor having a greater power capacity (relative to a power capacity of the second electric motor 2) and may continually provide output power to drive the vehicle when the vehicle is being driven. In accordance with those example embodiments, the second electric motor 2 can act as an assistant motor having a lower power capacity (relative to the power capacity of the first electric motor 1), and may be put into use under various circumstances so as to provide assistant driving power to the vehicle or to do other assistant work (such as driving an air conditioner).

When the vehicle is driven by the first electric motor 1 (the main motor), the second electric motor 2 (the assistant motor) may be switched to a neutral speed ratio so that it is not used. When any of a variety of vehicle operating conditions calls for the vehicle to use the second electric motor 2, the second electric motor 2 may be selectively put into use in either of the two speed ratios. The selectively of either of the two speed ratios provides that the second electric motor 2 can operate with greater efficiency than if only a single speed ratio is available for the second electric motor 2. In accordance with the example embodiments in which the first electric motor 1 continually provides output power to drive the vehicle when the vehicle is being driven, no power interruption of the vehicle will occur during the gear shifting of the second electric motor 2. Accordingly, during the driving of the vehicle, gear shifting without power interruption can be achieved, and thus the power performance and comfortability of the vehicle can be improved.

An electronic control unit can control the dual-motor power system 50, such as but not limited to, (i) controlling a device to switch the synchronizer 8 between the neutral position, the first speed-ratio position, and the second-speed-ratio position, (ii) switching the first electric motor 1 between on and off states, (iii) switching the second electric motor 2 between on and off states, (iv) switching the first electric motor 1 between clockwise and counter-clockwise rotations, (v) switching the second electric motor 2 between clockwise and counter-clockwise rotations, and (vi) switching a speed of the first electric motor 1, and (vii) switching a speed of the electric second motor 2. Other examples of functions controlled by electronic control unit are also possible.

Functions of controlling method(s) for the dual-motor power system 50 shown in FIG. 1 will be described now. The dual-motor power system 50 can be controlled by a method using a set of the described functions to work in the following modes.

The dual-motor power system 50 can be controlled to provide a first mode for driving a vehicle using the first electric motor 1 while not using the second electric motor 2. As shown in FIG. 3, the synchronizer 8 is in the neutral position, and the first electric motor 1 is put into use, so the first electric motor 1 alone can drive a vehicle in the first gear ratio, with the power transmission path following the first-motor power transmission path 24. This first mode is for forward driving of the vehicle and the first electric motor 1 turns in a forward direction (i.e., a direction that provides for forward driving of the vehicle).

The dual-motor power system 50 can be controlled to provide a second mode for driving a vehicle using the second electric motor 2 in the first speed ratio while not using the first electric motor 1. As shown in FIG. 4, by displacement of the synchronizer 8 (e.g., by axial movement of the engaging sleeve 9), the second electric motor 2 can be switched into the first speed ratio, so the second electric motor 2 is put into use, and the first electric motor 1 can be switched off, so that the second electric motor 2 alone drives the vehicle in the first gear ratio, with the power transmission path following the second-motor first-speed-ratio power transmission path 25. This second mode is for forward driving of the vehicle and the second electric motor 2 turns in a direction for the forward driving.

The dual-motor power system 50 can be controlled to provide a third mode for driving a vehicle by the second electric motor 2 in the second speed ratio while not using the first electric motor 1. As shown in FIG. 5, by displacement of the synchronizer 8 (e.g., by axial movement of the engaging sleeve 9), the second electric motor 2 can be switched into the second speed ratio, so the second electric motor 2 is put into use, and the first electric motor 1 can be switched off, so that the second electric motor 2 alone drives the vehicle in the second gear ratio, with the power transmission path following the second-motor second-speed-ratio power transmission path 26. This third mode is for forward driving of the vehicle and the second electric motor 2 turns in a direction for the forward driving.

The dual-motor power system 50 can be controlled to provide a fourth mode for driving a vehicle by the first electric motor 1, in combination with the second electric motor 2 in the first speed ratio. As shown in FIG. 6, by displacement of the synchronizer 8 (e.g., by axial movement of the engaging sleeve 9), the second electric motor 2 can be switched into the first speed ratio, and the first electric motor 1 and the second electric motor 2 are both put into use, so that the first electric motor 1 and the second electric motor 2 drive the vehicle in combination in the first gear ratio, with the power transmission path following the first-motor combined with second-motor in first-speed-ratio power transmission path 27. This fourth mode is for forward driving of the vehicle and the first electric motor 1 and the second electric motor 2 turn in directions for the forward driving.

The dual-motor power system 50 can be controlled to provide a fifth mode for driving a vehicle by the first electric motor 1, in combination with the second electric motor 2 in the second speed ratio. As shown in FIG. 7, by displacement of the synchronizer 8 (e.g., by axial movement of the engaging sleeve 9), the second electric motor 2 can be switched into the second speed ratio, and the first electric motor 1 and the second electric motor 2 are both put into use, so that the first electric motor 1, in the first gear ratio, and the second electric motor 2, in the second gear ratio, drive the vehicle in combination, with the power transmission path following the first-motor combined with second-motor in second-speed-ratio power transmission path 28. This fifth mode is for forward driving of the vehicle and the first electric motor 1 and the second electric motor 2 turn in directions for the forward driving.

The dual-motor power system 50 can be controlled to provide a sixth mode for driving a vehicle. The sixth mode is for reverse driving. In this sixth mode, the dual-motor power system 50 is in the same state as one of the first to fifth modes described above, with the corresponding motor(s) rotating in reverse direction(s) (i.e., direction(s) opposite the forward direction(s) used for the selected first to fifth mode.

Figure 8:
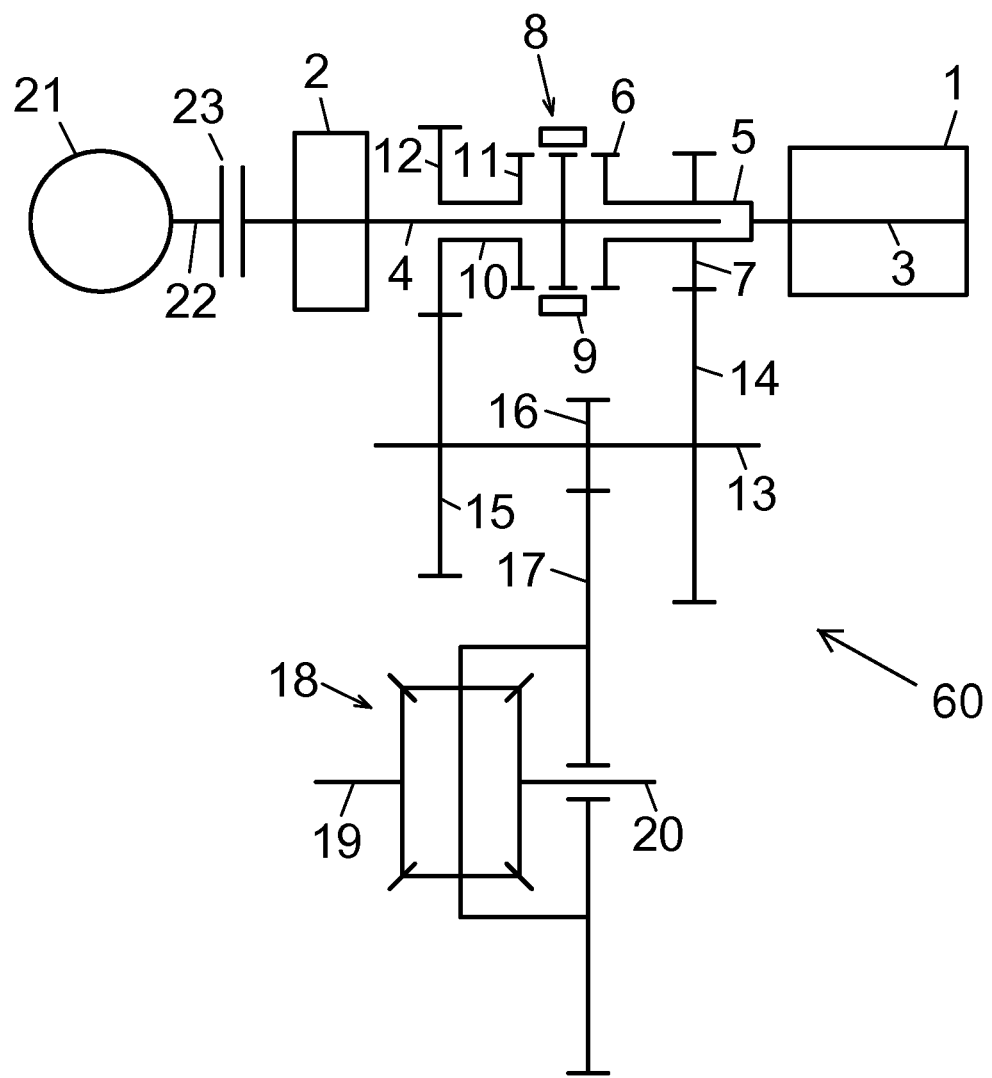
FIG. 8 is a schematic view showing the structure of a dual-motor hybrid power system for a vehicle, in which an engine is incorporated, according to another embodiment of the disclosure.

It is appreciated that, according to the spirit of the disclosure, the dual-motor power system 50 and the controlling method described above can be modified in various ways. For example, the dual-motor power system 50 described above can be modified by adding an engine 21 therein to form a dual-motor hybrid power system 60 as shown in FIG. 8. Since the dual-motor hybrid power system 60 can be formed by modifying the dual-motor power system 50, the dual-motor hybrid power system 60 can include the components of the dual-motor power system 50. At least some of the aspects of the dual-motor hybrid power system 60 that are similar to that of the dual-motor power system 50 and described above are not described below.

The power source of the dual-motor hybrid power system 60 includes the first electric motor 1 and the second electric motor 2 disposed to be opposing to each other, and an engine 21 disposed behind the second electric motor 2 (at a side of the second electric motor 2 which is distal from the first electric motor 1). An output shaft 22 of the engine 21 is coaxial with the second driving shaft 4 of the second electric motor 2, and can be coupled and decoupled with/from the second driving shaft 4 by a clutch 23.

In the dual-motor hybrid power system 60, the second electric motor 2 may be an integrated starter and generator (ISG), that is to say, it can act as a starter for the engine 21 and also act to generate electricity in a regenerative braking system of the vehicle. Of course, the second electric motor 2 in the dual-motor hybrid power system 60 can act to perform any and all of the functions the second electric motor 2 can perform in the dual-motor power system 50.

In the dual-motor hybrid power system 60, the first electric motor 1, the second electric motor 2 and the engine 21 may be put into use individually to drive the vehicle, or may be put into use in combination to drive the vehicle. The power transmission path for each condition will be described now.

First, the hybrid power system 60 includes power transmission paths that match the first-motor power transmission path 24 shown in FIG. 3, the second-motor first-speed-ratio power transmission path 25 shown in FIG. 4, the second-motor second-speed-ratio power transmission path 26 shown in FIG. 5, the first-motor combined with second-motor in first-speed-ratio power transmission path 27 shown in FIG. 6, and the first-motor combined with second-motor in second-speed-ratio power transmission path 28 shown in FIG. 7, and are not described again.

Figure 9:
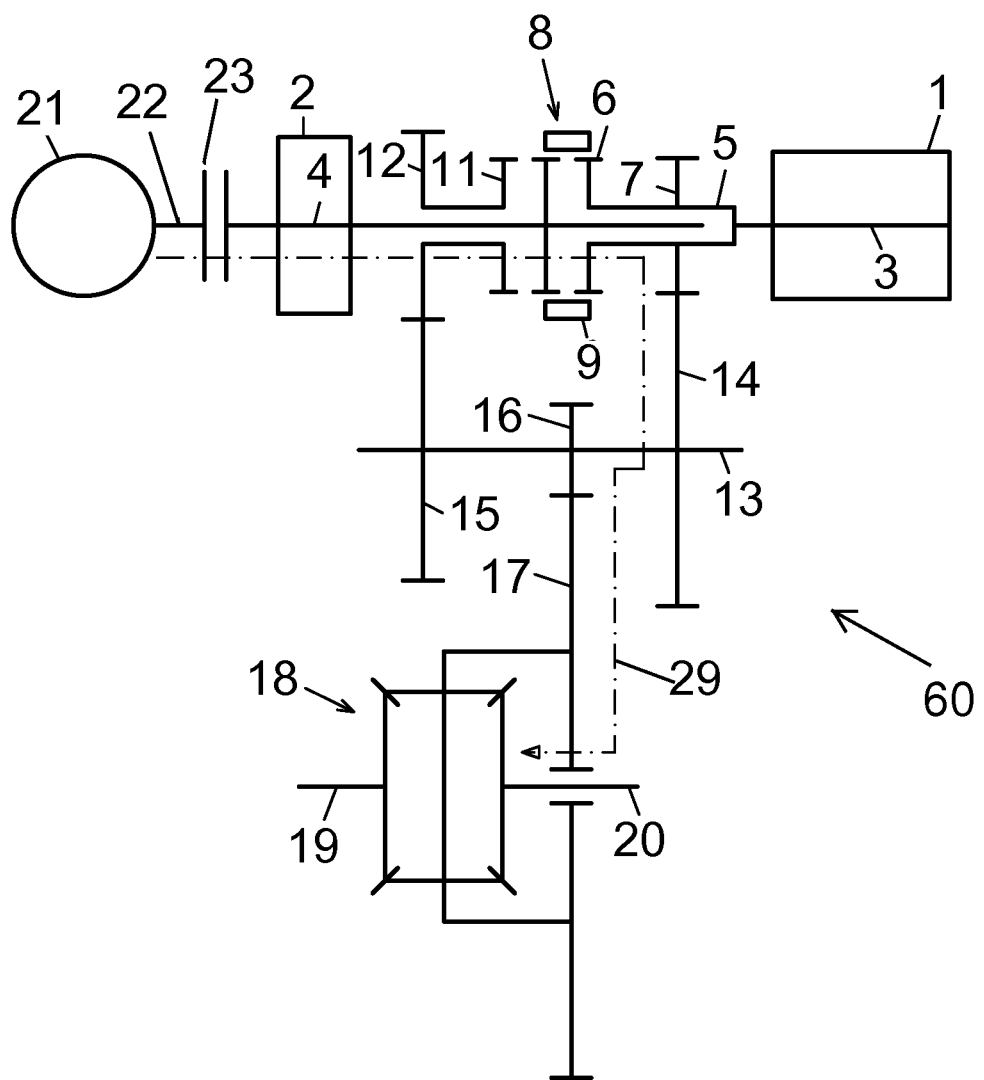
FIGS. 9-16 are schematic views showing power transmission paths of the dual-motor hybrid power system.

Next, FIG. 9 shows, by dotted dash lines, the hybrid power system 60 can include an engine first-speed-ratio power transmission path 29. For this power transmission path, the engaging sleeve 9 of the synchronizer 8 is engaged with the first engagement portion 6 and the clutch 23 is engaged, so that the engine output shaft 22 is coupled with the second driving shaft 4. In this way, the output power of the engine 21 is transmitted through the engine output shaft 22, the clutch 23, the second driving shaft 4, the synchronizer 8, the transmission sleeve 5, the first-gear-ratio drive gearwheel 7, the first-gear-ratio driven gearwheel 14, the intermediate shaft 13, the output drive gearwheel 16 and the output driven gearwheel 17 to the differential 18, and is then output to the vehicle wheels by the output shafts 19, 20 of the differential 18.

Figure 10:
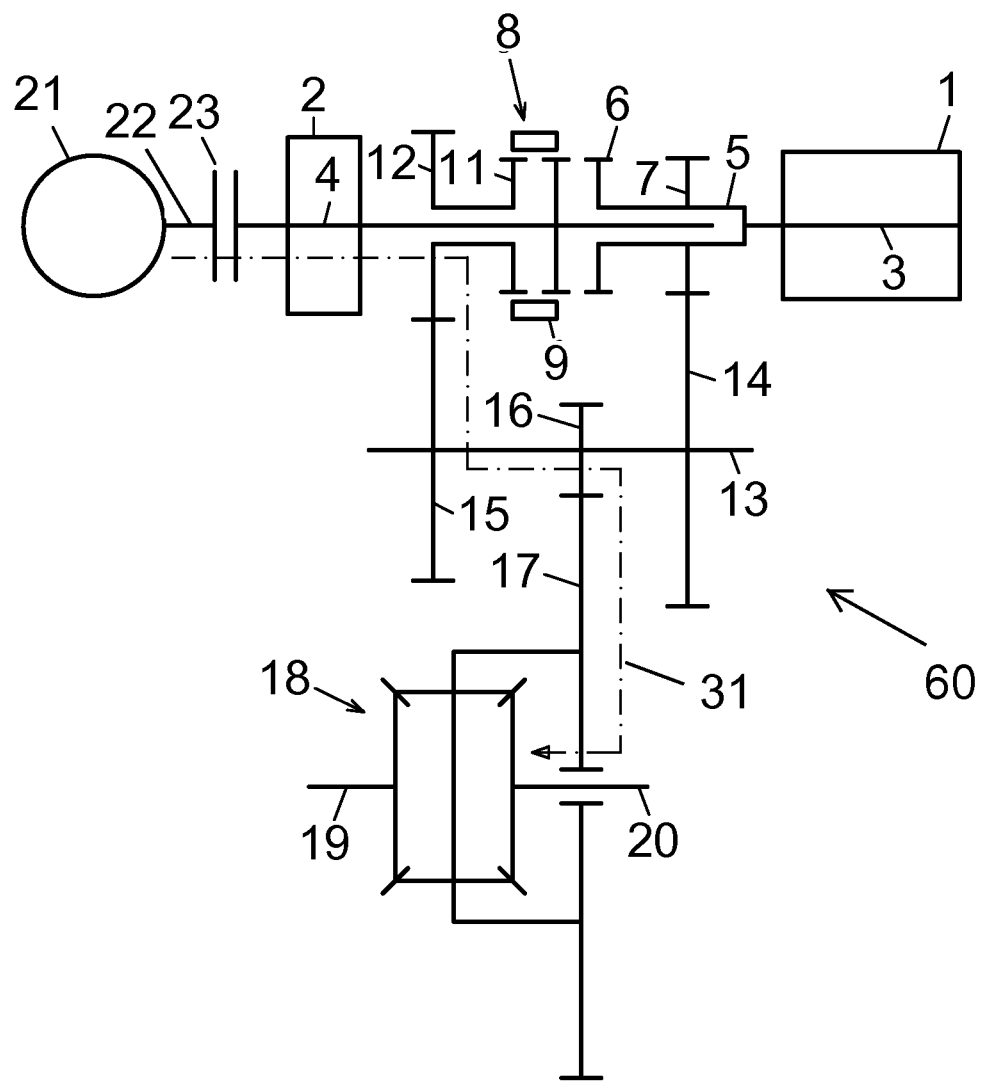

Next, FIG. 10 shows, by dotted dash lines, the hybrid power system 60 can include an engine second-speed-ratio power transmission path 31. For this power transmission path, the engaging sleeve 9 of the synchronizer 8 is engaged with the second engagement portion 11, and the clutch 23 is engaged. In this way, the output power of the engine 21 is transmitted through the engine output shaft 22, the clutch 23, the second driving shaft 4, the synchronizer 8, the second-gear-ratio drive gearwheel 12, the second-gear-ratio driven gearwheel 15, the intermediate shaft 13, the output drive gearwheel 16, and the output driven gearwheel 17 to the differential 18, and is then output to the vehicle wheels by the output shafts 19, 20 of the differential 18.

Figure 11:
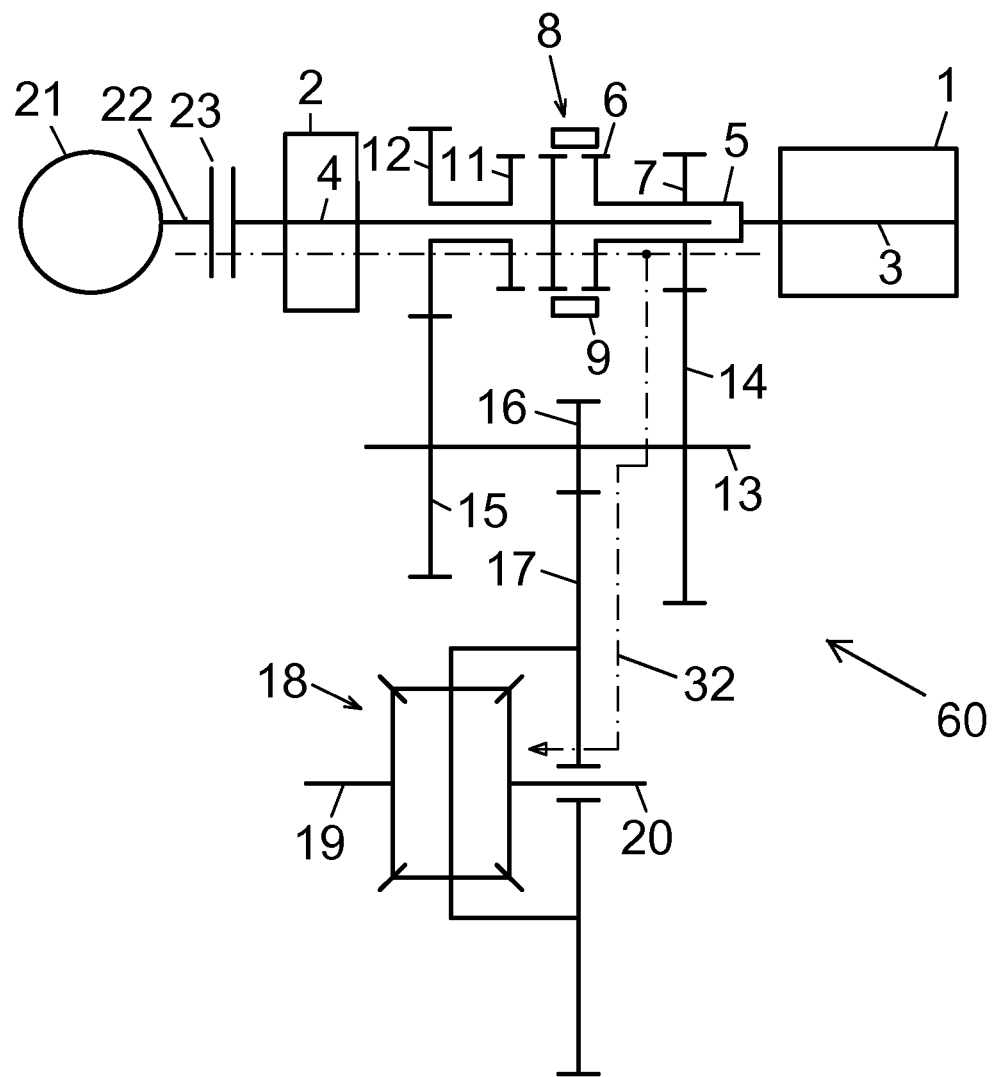

Next, FIG. 11 shows, by dotted dash lines, the hybrid power system 60 can include a first-motor combined with engine in first-speed-ratio power transmission path 32. For this power transmission path, the first electric motor 1 and the second electric motor 2 are put into operation in combination. For this power transmission path, the engaging sleeve 9 of the synchronizer 8 is engaged with the first engagement portion 6, and the clutch 23 is engaged. In this way, the output power of the first electric motor 1 is transmitted from the first driving shaft 3 to the transmission sleeve 5, and the output power of the engine 21 is transmitted through the engine output shaft 22, the clutch 23, the second driving shaft 4, and the synchronizer 8 to the transmission sleeve 5. The output powers of the first electric motor 1 and the engine 21 are combined at the transmission sleeve 5, and the combined power is transmitted in the first gear ratio. In particular, the combined power is transmitted through the first-gear-ratio drive gearwheel 7, the first-gear-ratio driven gearwheel 14, the intermediate shaft 13, the output drive gearwheel 16, and the output driven gearwheel 17 to the differential 18, and is then output to the vehicle wheels by the output shafts 19, 20 of the differential 18.

Figure 12:
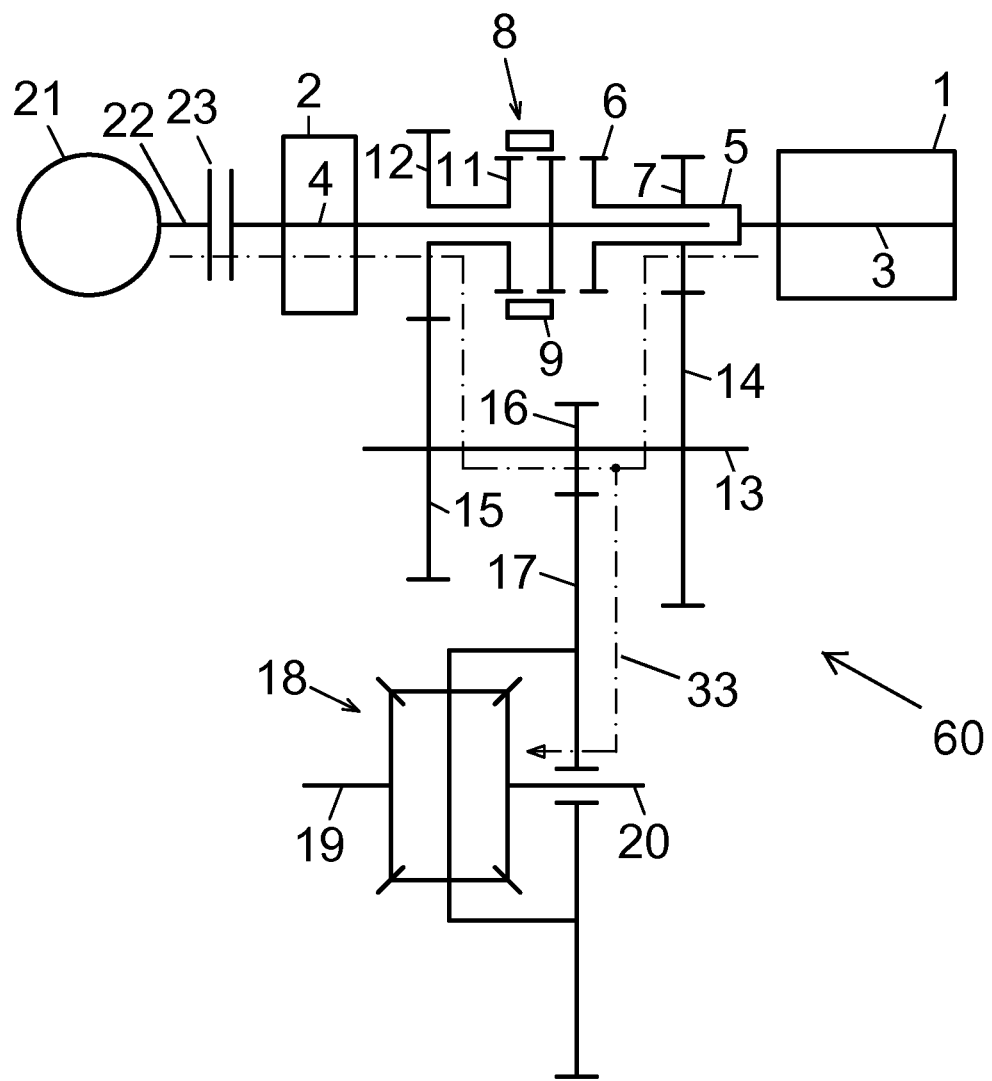

Next, FIG. 12 shows, by dotted dash lines, the hybrid power system 60 can include a first-motor combined with engine in second-speed-ratio power transmission path 33.

For this power transmission path, the first electric motor 1 and the second electric motor 2 are put into operation in combination. For this power transmission path, the engaging sleeve 9 of the synchronizer 8 is engaged with the second engagement portion 11, and the clutch 23 is engaged. In this way, the output power of the first electric motor 1 is transmitted in the first gear ratio through the first driving shaft 3, the transmission sleeve 5, the first-gear-ratio drive gearwheel 7, and the first-gear-ratio driven gearwheel 14 to the intermediate shaft 13, and the output power of the engine 21 is transmitted in the second gear ratio through the engine output shaft 22, the clutch 23, the second driving shaft 4, the synchronizer 8, the second-gear-ratio drive gearwheel 12, and the second-gear-ratio driven gearwheel 15 to the intermediate shaft 13. The output powers of the first electric motor 1 and the engine 21 are combined at the intermediate shaft 13, and the combined output power is transmitted through the output drive gearwheel 16 and the output driven gearwheel 17 to the differential 18, and is then output to the vehicle wheels by the output shafts 19, 20 of the differential 18.

Figure 13:
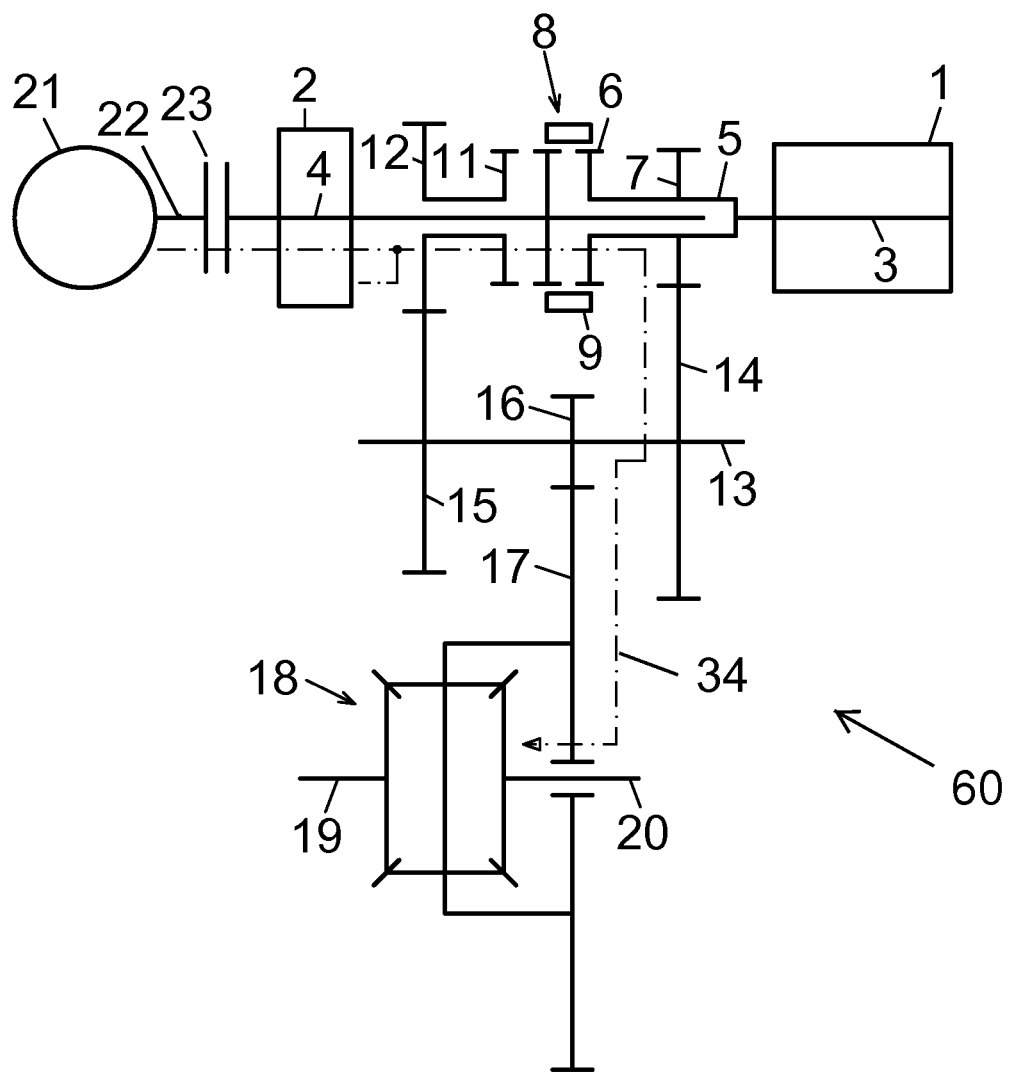

Next, FIG. 13 shows, by dotted dash lines, the hybrid power system 60 can include a second-motor and engine combined in first-speed-ratio power transmission path 34. For this power transmission path, the engaging sleeve 9 of the synchronizer 8 is engaged with the first engagement portion 6, and the clutch 23 is engaged. In this way, the output powers of the engine 21 and the second electric motor 2 are combined at the second driving shaft 4, and the combined output power is transmitted through the synchronizer 8, the transmission sleeve 5, the first-gear-ratio drive gearwheel 7, the first-gear-ratio driven gearwheel 14, the intermediate shaft 13, the output drive gearwheel 16 and the output driven gearwheel 17 to the differential 18, and is then output to the vehicle wheels by the output shafts 19, 20 of the differential 18.

Figure 14:
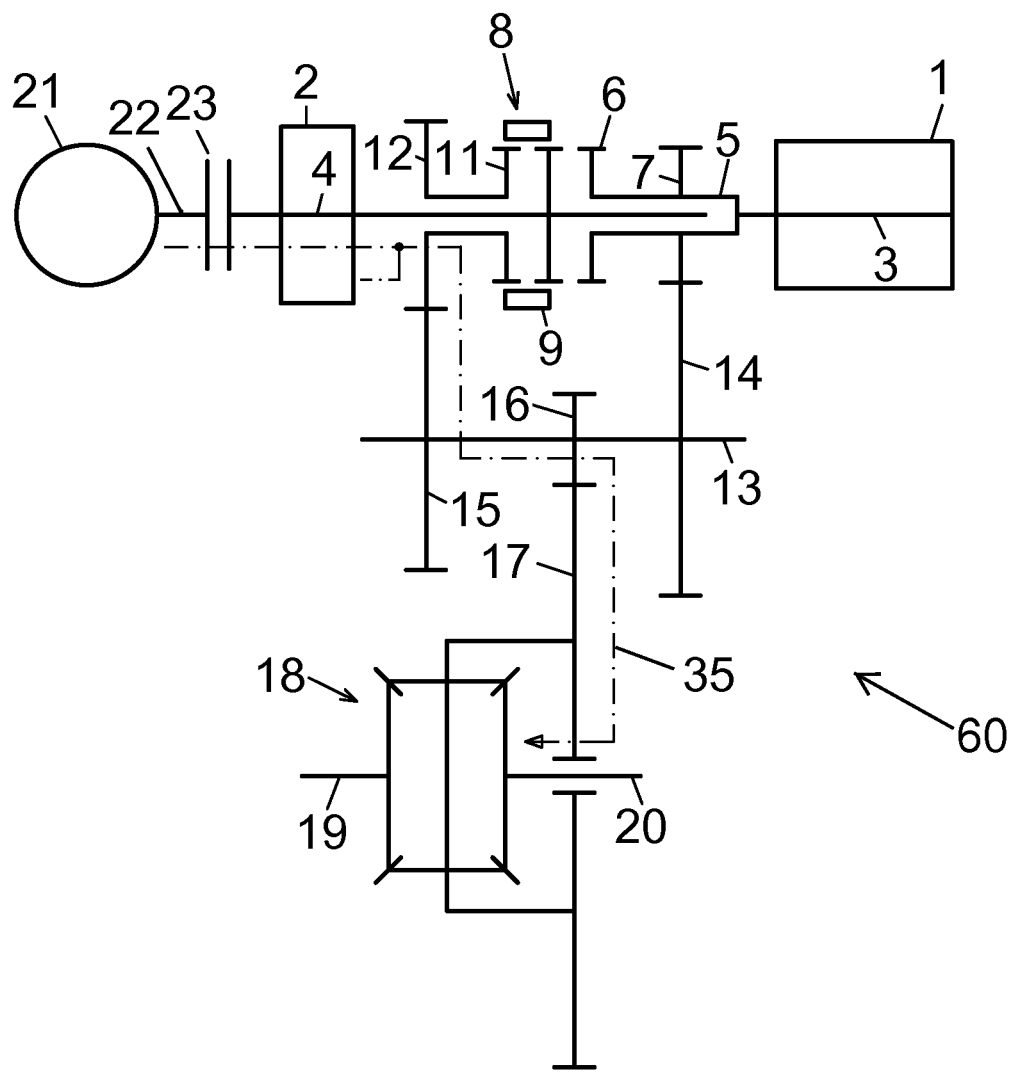

Next, FIG. 14 shows, by dotted dash lines, the hybrid power system 60 can include a second-motor and engine combined in second-speed-ratio power transmission path 35. For this power transmission path, the engaging sleeve 9 of the synchronizer 8 is engaged with the second engagement portion 11, and the clutch 23 is engaged. In this way, the output powers of the engine 21 and the second electric motor 2 are combined at the second driving shaft 4, and the combined output power is transmitted through the synchronizer 8, the second-gear-ratio drive gearwheel 12, the second-gear-ratio driven gearwheel 15, the intermediate shaft 13, the output drive gearwheel 16 and the output driven gearwheel 17 to the differential 18, and is then output to the vehicle wheels by the output shafts 19, 20 of the differential 18.

Figure 15:
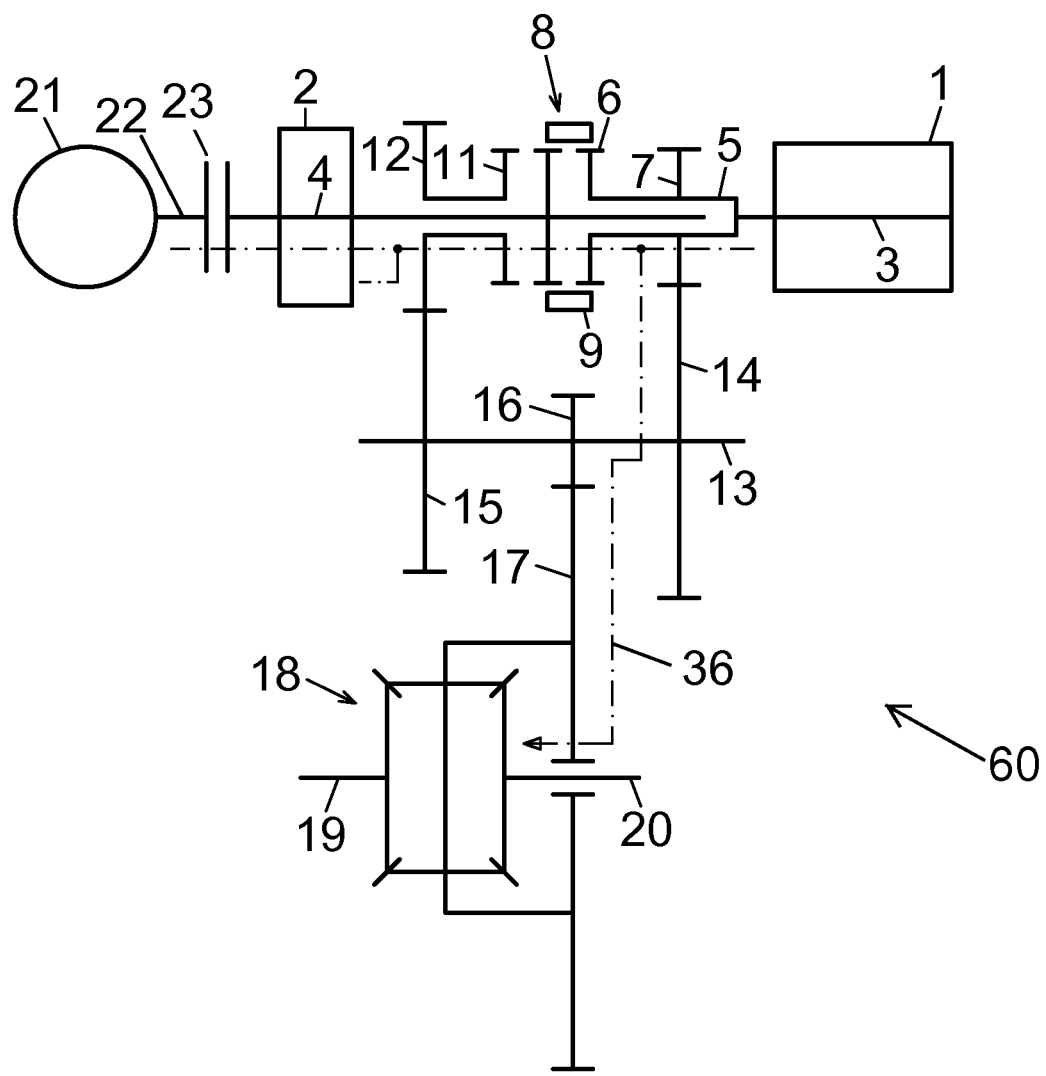

Next, FIG. 15 shows, by dotted dash lines, the hybrid power system 60 can include a first-motor combined with engine and second-motor in first-speed-ratio power transmission path 36. For this power transmission path, the first electric motor 1 and the second electric motor 2 are put into operation in combination. For this power transmission path, the engaging sleeve 9 of the synchronizer 8 is engaged with the first engagement portion 6, and the clutch 23 is engaged. In this way, the output power of the first electric motor 1 is transmitted from the first driving shaft 3 to the transmission sleeve 5. Further, the output powers of the engine 21 and the second electric motor 2 are combined at the second driving shaft 4, and the combined output power is transmitted through the synchronizer 8 to the transmission sleeve 5. At the transmission sleeve 5, all the output powers of the first electric motor 1, the second electric motor 2, and the engine 21 are combined together, and this combined output power is transmitted through the first-gear-ratio drive gearwheel 7, the first-gear-ratio driven gearwheel 14, the intermediate shaft 13, the output drive gearwheel 16 and the output driven gearwheel 17 to the differential 18, and is then output to the vehicle wheels by the output shafts 19, 20 of the differential 18.

Figure 16:
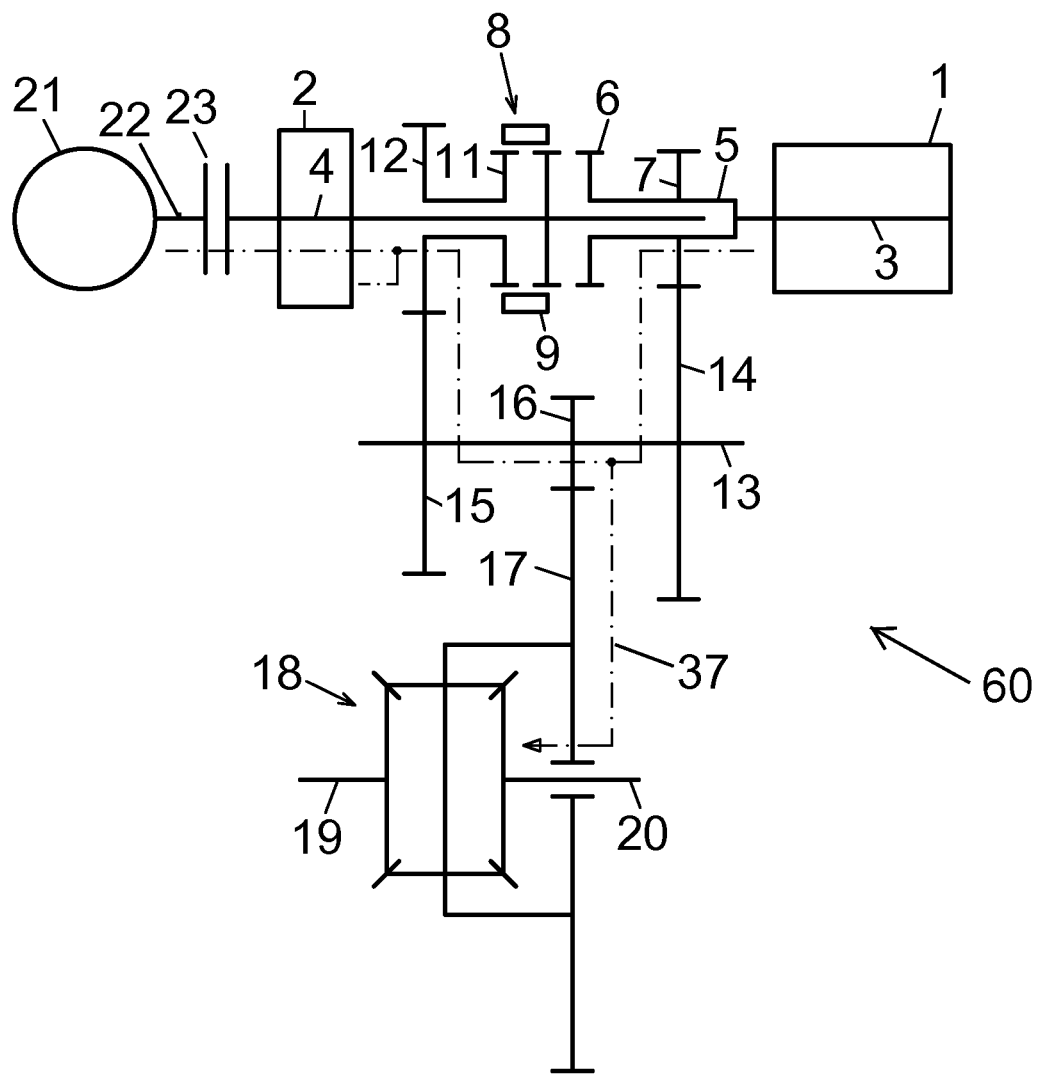

Next, FIG. 16 shows, by dotted dash lines, the hybrid power system 60 can include a first-motor combined with engine and second-motor in second-speed-ratio power transmission path 37. For this power transmission path, the first electric motor 1 and the second electric motor 2 are put into operation in combination. Furthermore, for this power transmission path, the engaging sleeve 9 of the synchronizer 8 is engaged with the second engagement portion 11, and the clutch 23 is engaged. In this way, the output power of the first electric motor 1 is transmitted in the first gear ratio through the first driving shaft 3, the transmission sleeve 5, the first-gear-ratio drive gearwheel 7, and the first-gear-ratio driven gearwheel 14 to the intermediate shaft 13. Further, the output powers of the engine 21 and the second electric motor 2 are combined at the second driving shaft 4, and the combined output power is transmitted through the second driving shaft 4, the synchronizer 8, the second-gear-ratio drive gearwheel 12, the second-gear-ratio driven gearwheel 15 in the second gear ratio to the intermediate shaft 13. At the intermediate shaft 13, all the output powers of the first electric motor 1, the second electric motor 2, and the engine 21 are combined, and this combined output power is transmitted through the output drive gearwheel 16 and the output driven gearwheel 17 to the differential 18, and is then output to the vehicle wheels by the output shafts 19, 20 of the differential 18.

Functions of controlling method(s) for the dual-motor hybrid power system 60 shown in FIG. 8 will be described now. The dual-motor hybrid power system 60 can be controlled by a method using a set of the described functions to work in the following modes.

In particular, the dual-motor hybrid power system 60 can be controlled to provide the following modes: (i) a mode for driving only by the first electric motor 1 (i.e., the first mode discussed above with respect to FIG. 3); (ii) a mode for driving only by the second electric motor 2 in the first speed ratio (i.e., the second mode discussed above with respect to FIG. 4); (iii) a mode for driving only by the second electric motor 2 in the second speed ratio (i.e., the third mode discussed above with respect to FIG. 5); (iv) a mode for driving by the first electric motor 1, in combination with the second electric motor 2 in the first speed ratio (i.e., the fourth mode discussed above with respect to FIG. 6); and (v) a mode for driving by the first electric motor 1, in combination with the second electric motor 2 in the second speed ratio (i.e., the fifth mode discussed above with respect to FIG. 7). Each of these modes is similar to one of driving modes available by use of the dual-motor power system 50 and the description of those driving modes is not repeated here.

The dual-motor hybrid power system 60 can be controlled to provide a seventh mode for driving a vehicle by driving with the engine 21 in first speed ratio while not using the first electric motor 1 and the second electric motor 2. In the seventh mode, the clutch 23 is engaged. As shown in FIG. 9, by the displacement of the synchronizer 8, the engine 21 can be switched into the first speed ratio, so the engine 21 is put into use, while the first electric motor 1 and the second electric motor 2 are powered off, so that the engine 21 drives the vehicle in the first gear ratio, with the power transmission path following the engine first-speed-ratio power transmission path 29.

The dual-motor hybrid power system 60 can be controlled to provide an eighth mode for driving a vehicle by driving with the engine 21 in second speed ratio while not using the first electric motor 1 and the second electric motor 2. In the eighth mode, the clutch 23 is engaged. As shown in FIG. 10, by the displacement of the synchronizer 8, the engine 21 can be switched into the second speed ratio, so the engine 21 is put into use, while the first electric motor 1 and the second electric motor 2 are powered off, so that the engine 21 drives the vehicle in the second gear ratio, with the power transmission path following the second-speed-ratio power transmission path 31.

The dual-motor hybrid power system 60 can be controlled to provide a ninth mode for driving a vehicle by driving the first electric motor 1 in combination with the engine 21 driving in first speed ratio while not using the second electric motor 2. In the ninth mode, the clutch 23 is engaged. As shown in FIG. 11, by the displacement of the synchronizer 8, the engine 21 can be switched into the first speed ratio, so the first electric motor 1 and the engine 21 are put into use, and the second electric motor 2 is powered off, so that the first electric motor 1 and the engine 21 drive the vehicle in combination in the first gear ratio, with the power transmission path following the first-motor combined with engine in first-speed-ratio power transmission path 32. This ninth mode is for forward driving of the vehicle and the first electric motor 1 turns in a direction for the forward driving.

The dual-motor hybrid power system 60 can be controlled to provide a tenth mode for driving a vehicle by driving by the first electric motor 1 in combination with the engine driving in second speed ratio while not using the second electric motor 2. In the tenth mode, the clutch 23 is engaged. As shown in FIG. 12, by the displacement of the synchronizer 8, the engine 21 can be switched into the second speed ratio, so the first electric motor 1 and the engine 21 are put into use, and the second electric motor 2 is powered off, so that the first electric motor 1, in the first gear ratio, and the engine 21, in the second gear ratio, drive the vehicle in combination, with the power transmission path following the first-motor combined with engine in second-speed-ratio power transmission path 33. This tenth mode is for forward driving of the vehicle and the first electric motor 1 turns in a direction for the forward driving.

The dual-motor hybrid power system 60 can be controlled to provide an eleventh mode for driving a vehicle by driving by the engine and the second motor in combination in the first speed ratio. In the eleventh mode, the clutch 23 is engaged. As shown in FIG. 13, by the displacement of the synchronizer 8, the engine 21 and the second electric motor 2 are switched into the first speed ratio, so the engine 21 and the second electric motor 2 are put into use, and now the first electric motor 1 can be switched off, so that the engine 21 and the second electric motor 2 drives the vehicle in combination in the first gear ratio, with the power transmission path following the second-motor and engine combined in first-speed-ratio power transmission path 34. This eleventh mode is for forward driving of the vehicle and the second electric motor 2 turns in a direction for the forward driving.

The dual-motor hybrid power system 60 can be controlled to provide a twelfth mode for driving a vehicle by driving by the engine and the second motor in combination in second speed ratio. In the twelfth mode, the clutch 23 is engaged. As shown in FIG. 14, by the displacement of the synchronizer 8, the engine 21 and the second electric motor 2 are switched into the second speed ratio, so the engine 21 and the second electric motor 2 are put into use, and now the first electric motor 1 can be switched off, so that the engine 21 and the second electric motor 2 drives the vehicle in combination in the second gear ratio, with the power transmission path following the second-motor and engine combined in second-speed-ratio power transmission path 35. This twelfth mode is for forward driving of the vehicle and the second electric motor 2 turns in a direction for the forward driving.

The dual-motor hybrid power system 60 can be controlled to provide a thirteenth mode for driving a vehicle by driving by the first electric motor 1, in combination with the engine and the second motor driving in first speed ratio. In the thirteenth mode, the clutch 23 is engaged. As shown in FIG. 15, by the displacement of the synchronizer 8, the engine 21 and the second electric motor 2 are switched into the first speed ratio, so the first electric motor 1, the second electric motor 2, and the engine 21 are all put into use, so that the first electric motor 1, and the second electric motor 2 and the engine 21 drive the vehicle in combination in the first gear ratio, with the power transmission path following the first-motor combined with engine and second-motor in first-speed-ratio power transmission path 36. This thirteenth mode is for forward driving of the vehicle and the first electric motor 1 and the second electric motor 2 turn in directions for the forward driving.

The dual-motor hybrid power system 60 can be controlled to provide a fourteenth mode for driving a vehicle by driving by the first electric motor 1, in combination with the engine and the second motor driving in the second speed ratio. In the fourteenth mode, the clutch 23 is engaged. As shown in FIG. 16, by the displacement of the synchronizer 8, the engine 21 and the second electric motor 2 are switched into the second speed ratio, so the first electric motor 1, the second electric motor 2 and the engine 21 are all put into use, so that the first electric motor 1 drives the vehicle in the first gear ratio, and the second electric motor 2 and the engine 21 drives the vehicle in combination in the second gear ratio, with the power transmission path following the first-motor combined with engine and second-motor in second-speed-ratio power transmission path 37. This fourteenth mode is for forward driving of the vehicle and the first electric motor 1 and the second electric motor 2 turn in directions for the forward driving.

The dual-motor hybrid power system 60 can be controlled to provide a fifteenth mode for reverse driving. In the fifteenth mode, the clutch 23 is disengaged, so that a pure electrically powered reverse driving mode is adopted, similar to the reverse driving mode of the dual-motor power system 50 (i.e., the sixth mode described above). Accordingly, in the fifteenth mode, the dual-motor hybrid power system 60, is in the same state as one of the first to fifth modes described above, with the corresponding motor(s) rotating in reverse direction(s) (i.e., direction(s) opposite the forward direction(s) used for the selected first to fifth mode.

The dual-motor hybrid power system 60 can be controlled to provide a sixteenth mode for generating electricity by the second electric motor 2. The synchronizer 8 is put into the neutral position and the clutch 23 is engaged so that the output power of the engine 21 is transmitted to the second electric motor 2. The second electric motor 2 can generate electricity as a result of output power of the engine 21 being transmitted thereto. In one respect, the electricity generated by the electric motor 2 can be transferred by an electrical system to a battery (not shown) of the vehicle. In another respect, the electricity generated by the electric motor 2 can be transferred directly to the first electric motor 1. This transfer of electricity can occur while the first electric motor 1 is outputting power via the first-motor power transmission path 24 so as to allow for vehicle driving.

The dual-motor hybrid power system 60 can include an electronic control unit configured like the electronic control unit described above with respect to the dual-motor power system 50. Furthermore, the electronic control unit for the dual-hybrid power system 60 can control switching the clutch 23 between engaged and disengaged positions. In the engaged position of the clutch 23, the output shaft 22 of the engine 21 is coupled to the second driving shaft 4. In the disengaged position of the clutch 23, the output shaft of the engine is decoupled from the second driving shaft 4. The electronic control unit for the dual-motor hybrid power system 60 can control the components of the dual-motor hybrid power system 60 to provide any one or more of the first to sixteenth modes described herein. The electronic control unit for the dual-motor power system 50 can control the components of the dual-motor hybrid power system 50 to provide any one or more of the first to fifth modes described herein.

According to a further aspect of the disclosure, a one-way clutch 30 can be disposed between the first electric motor 1 and the second electric motor 2 for kinematically coupling and decoupling the two motors with/from each other. Example embodiments regarding this further aspect are shown in FIG. 17 and FIG. 18.

Figure 17:
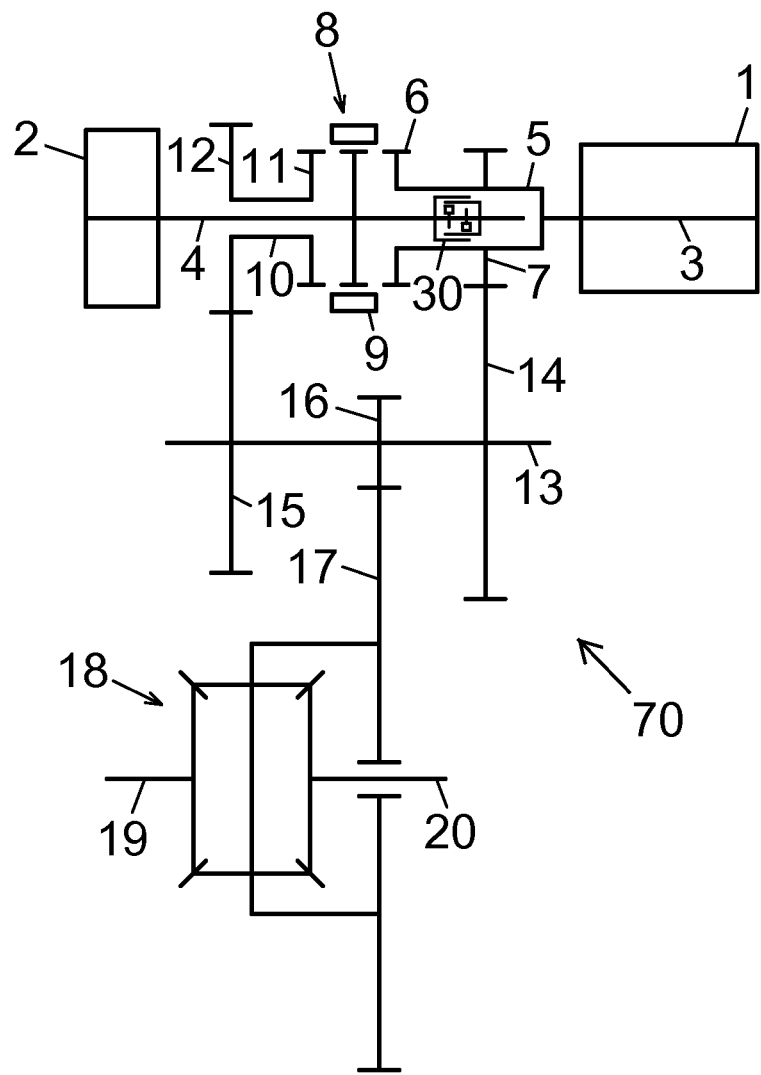
FIGS. 17 and 18 are schematic views showing the structures of additional features of example embodiments.
Figure 18:
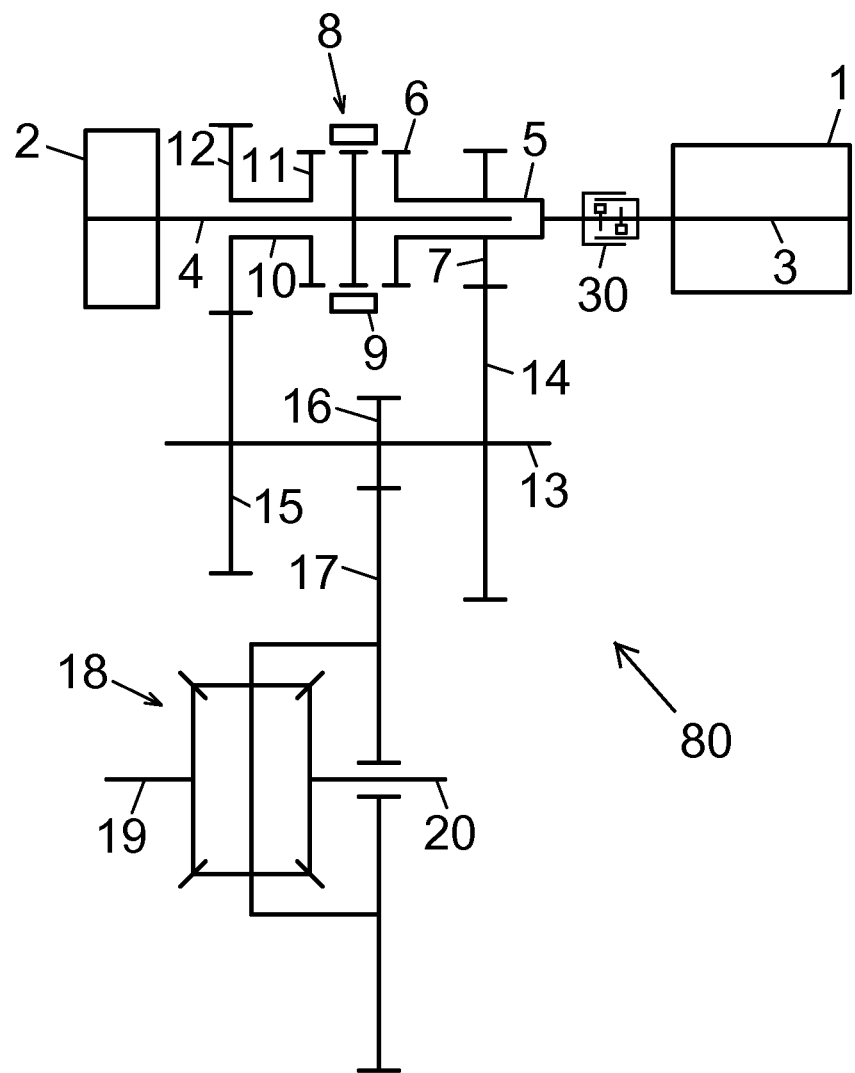

Next, FIG. 17 shows a dual-motor power system 70. The dual-motor power system 70 is based on the dual-motor power system 50. In that regard, the dual-motor power system 70 can include the components of the dual-motor power system 50. The dual-motor power system 70 also includes a one-way clutch 30 arranged between the transmission sleeve 5 and the second driving shaft 4. The transmission sleeve 5 can include an inner periphery and an outer periphery. The second driving shaft 4 can include an outer periphery having a dimension smaller than a dimension of the inner periphery of the transmission sleeve 5 such that at least a portion of the second driving shaft 4 can be disposed within the hollow cylinder of the transmission sleeve 5. The one-way clutch 30 can be disposed between the outer periphery of the second driving shaft and the inner periphery of the transmission sleeve 5. A person having ordinary skill in the art will understand that the one-way clutch 30 can also be added to the dual-motor hybrid power system 60 in a manner similar to that shown in, and described with respect to, FIG. 17. Accordingly, the following description is applicable to the dual-motor power system 70 and to the dual-motor hybrid power system 60 including the one-way clutch 30.

The one-way clutch 30 can be orientated in such a way that allows, during the forward driving of the vehicle, the rotation speed of the transmission sleeve 5 to be greater than that of the second driving shaft 4, but does not allow the rotation speed of the second driving shaft 4 to be greater than that of the transmission sleeve 5. In this way, the torque of the second driving shaft 4 in the forward direction (i.e., the torque outputting direction during forward driving of the vehicle) can be transmitted to the transmission sleeve 5, while the torque of the transmission sleeve 5 in the forward direction cannot be transmitted to the second driving shaft 4. By means of this configuration, the functions described below can be achieved.

When the vehicle is driven forward only by the first electric motor 1, the second electric motor 2 can rotate (or the second electric motor 2 and the engine 21 can rotate) in an idling state or can rotate at the same speed as the first electric motor 1. When the driver wishes to accelerate the vehicle, the power systems do not need to switch the synchronizer 8 to the first speed ratio from the neutral speed ratio. Instead, the second electric motor 2 (or the second electric motor 2 and the engine 21) may directly output an assistant power by increasing the speed thereof. The assistant torque is transmitted via the one-way clutch 30 to the transmission sleeve 5. In this way, the powers of the two motors (or in combination with that of the engine 21) can be transmitted through the transmission sleeve 5, the first-gear-ratio drive gearwheel 7, the first-gear-ratio driven gearwheel 14, the intermediate shaft 13 and the main differential 18 to the driving wheels of the vehicle. As a result, a quicker acceleration response can occur by omitting the gear shifting time. In this variant, the first electric motor 1 can act to recover vehicle braking energy.

Next, FIG. 18 shows a dual-motor power system 80. The dual-motor power system 80 is based on the dual-motor power system 50. In that regard, the dual-motor power system 80 can include the components of the dual-motor power system 50. The dual-motor power system 80 also includes a one-way clutch 30 disposed between the transmission sleeve 5 and the first driving shaft 3. As shown in FIG. 18, the one-way clutch 30 is axially disposed between the transmission sleeve 5 and the first driving shaft. A person having ordinary skill in the art will understand that the one-way clutch 30 can also be added to the dual-motor hybrid power system 60 in a manner similar to that shown in, and described with respect to, FIG. 18. Accordingly, the following description is applicable to the dual-motor power system 80 and to the dual-motor hybrid power system 60 including the one-way clutch 30.

The one-way clutch 30 can be orientated in a way that allows, during the forward driving of the vehicle, the rotation speed of the transmission sleeve 5 to be greater than that of the first driving shaft 3, but does not allow the rotation speed of the first driving shaft 3 to be greater than that of the transmission sleeve 5. In this way, the torque of the first driving shaft 3 in the forward direction can be transmitted to the transmission sleeve 5, but the torque of the transmission sleeve 5 in the forward direction cannot be transmitted to the first driving shaft 3. By means of this configuration, the functions described below can be achieved.

The first driving shaft 3 for the example embodiment shown in FIG. 18 can include a first shaft part and a second shaft part. The first shaft part can include a portion that is fixed to the transmission sleeve 5 and another portion that engages the one-way clutch 30. The second shaft part can include a portion that is disposed within the first electric motor 1 and another portion that engages the one-way clutch 30. The first and second shaft parts of the first driving shaft 3 are disposed on opposite sides of the one-way clutch 30.

The vehicle for forward driving can be powered mainly by the second electric motor 2 (or also by the engine 21 in combination with the second electric motor 2), while the first electric motor 1 is in an idling state or keeps rotating in the same speed as the second electric motor 2. When the driver wishes to accelerate the vehicle, the first electric motor 1 may output an assistant torque at an increased speed, the assistant torque being transmitted via the one-way clutch 30 to the transmission sleeve 5. Thus, the powers of the two driving motors (or in combination with that of the engine 21) can be transmitted through the intermediate shaft 13 and to the main differential 18 to the driving wheels of the vehicle. As a result, a quicker acceleration response can occur by omitting the gear shifting time. In addition, when the vehicle is driving only by the engine 21, an efficiency loss caused by the first electric motor 1 passively driving by the engine 21 can be avoided. In accordance with this embodiment, the second electric motor 2 can act to recover vehicle braking energy.

III. Transmission Embodiments

The dual-motor power system 50 can include a transmission mechanism (or more simply, a "transmission"). As an example, a transmission of the dual-motor power system 50 can include the transmission sleeve 5, the first engagement portion 6, the first-gear-ratio drive gearwheel 7, the synchronizer 8, the engaging sleeve 9, the supporting sleeve 10, the second engagement portion 11, the second-gear-ratio drive gearwheel 12, the intermediate shaft 13, the first-gear-ratio driven gearwheel 14, the second-gear-ratio driven gearwheel 15, the output drive gearwheel 16, the output driven gearwheel 17, the differential 18, the output shaft 19, the output shaft 20, as shown in, and described with respect to, FIG. 1. The transmission of the dual-motor power system 50 can include the first driving shaft 3 and the second driving shaft 4. The transmission of the dual-motor power system 50 can include the one-way clutch 30 as shown in FIG. 17 or as shown in FIG. 18.

The dual-motor hybrid power system 60 can include a transmission. As an example, a transmission of the dual-motor hybrid power system 60 can include the transmission sleeve 5, the first engagement portion 6, the first-gear-ratio drive gearwheel 7, the synchronizer 8, the engaging sleeve 9, the supporting sleeve 10, the second engagement portion 11, the second-gear-ratio drive gearwheel 12, the intermediate shaft 13, the first-gear-ratio driven gearwheel 14, the second-gear-ratio driven gearwheel 15, the output drive gearwheel 16, the output driven gearwheel 17, the differential 18, the output shaft 19, the output shaft 20, as shown in, and described with respect to, FIG. 8. The transmission of the dual-motor hybrid power system 60 can include the first driving shaft 3 and the second driving shaft 4. The transmission of the dual-motor hybrid power system 60 can include the one-way clutch 30 as shown in FIG. 17 or as shown in FIG. 18.

IV. Additional Example Embodiments

The following examples set out further or alternative aspects of the disclosure. Any reference characters (e.g., numbers or letters) to items in the figures or to the figures are for ease of reference only and are not limiting on the scope of the other examples described herein.

Example 1

A dual-motor power system for a vehicle, comprising: a first motor (1) having a first driving shaft (3); a second motor (2) having a second driving shaft (4) disposed to be coaxial with the first driving shaft; an intermediate shaft (13) disposed to be parallel with the first and second driving shafts; a differential (18) driven by the intermediate shaft; a first gear set disposed between the first driving shaft and the intermediate shaft and having a first speed reducing ratio, the first driving shaft couples with the intermediate shaft via the first gear set; a second gear set disposed between the second driving shaft and the intermediate shaft and having a second speed reducing ratio; and a single synchronizer (8) disposed around the second driving shaft between the first and the second motor in an axial direction, the synchronizer being configured to be switched between a neutral position, a first-speed-ratio position and a second-speed-ratio position, wherein in the neutral position, the second driving shaft is decoupled from the first and second gear sets, in the first-speed-ratio position, the synchronizer couples the second driving shaft with the intermediate shaft via the first gear set, and in the second-speed-ratio position, the synchronizer couples the second driving shaft with the intermediate shaft via the second gear set.

Example 2

A dual-motor hybrid power system for a vehicle, comprising: a first motor (1) having a first driving shaft (3); a second motor (2) having a second driving shaft (4) disposed to be coaxial with the first driving shaft; an engine (21) disposed to be coupled with the second driving shaft via a clutch; an intermediate shaft (13) disposed to be parallel with the first and second driving shafts; a differential (18) driven by the intermediate shaft; a first gear set disposed between the first driving shaft and the intermediate shaft and having a first speed reducing ratio, the first driving shaft couples with the intermediate shaft via the first gear set; a second gear set disposed between the second driving shaft and the intermediate shaft and having a second speed reducing ratio; and a single synchronizer (8) disposed around the second driving shaft between the first and the second motor in an axial direction, the synchronizer being configured to be switched between a neutral position, a first-speed-ratio position and a second-speed-ratio position, wherein in the neutral position, the second driving shaft is decoupled from the first and second gear sets, in the first-speed-ratio position, the synchronizer couples the second driving shaft with the intermediate shaft via the first gear set, and in the second-speed-ratio position, the synchronizer couples the second driving shaft with the intermediate shaft via the second gear set.

Example 3

The system of example 1 or 2, further comprising a transmission sleeve (5) fixed to the first driving shaft, a tip end of the second driving shaft being inserted into the transmission sleeve and being rotatably supported by the transmission sleeve.

Example 4

The system of example 3, wherein the first gear set comprises a first-gear-ratio drive gearwheel (7) fixedly carried by the transmission sleeve and a first-gear-ratio driven gearwheel (14) fixed to the intermediate shaft and meshed with the first-gear-ratio drive gearwheel; and wherein the second gear set comprises a second-gear-ratio drive gearwheel (12) carried by and being rotatable relative to the second driving shaft and a second-gear-ratio driven gearwheel (15) mounted to the intermediate shaft and meshed with the second-gear-ratio drive gearwheel.

Example 5

The system of example 4, wherein the synchronizer comprises: an engaging sleeve (9) carried by the second driving shaft and being able to be displaced in the axial direction; a first engagement portion (6) provided on the transmission sleeve; and a second engagement portion (11) carried by and being rotatable relative to the second driving shaft, the second engagement portion being connected with the second-gear-ratio drive gearwheel; wherein when the synchronizer is in the neutral position, the engaging sleeve is disengaged from the first and the second engagement portions, when the synchronizer is in the first-speed-ratio position, the engaging sleeve is engaged with the first engagement portion, and when the synchronizer is in the second-speed-ratio position, the engaging sleeve is engaged with the second engagement portion.

Example 6

The system of example 5, wherein the second engagement portion and the second-gear-ratio drive gearwheel are fixed to opposite ends of a supporting sleeve (10) respectively, the supporting sleeve being carried by and being rotatable relative to the second driving shaft.

Example 7

The system of example 5 or 6, wherein the transmission sleeve has a main body having a cylindrical shape and having a central axis coinciding with that of the first driving shaft, the transmission sleeve has a first end which is fixed to a tip end of the first driving shaft and an opened second end which is provided with the first engagement portion on its outer periphery, the second driving shaft being inserted into the transmission sleeve from the second end of the transmission sleeve.

Example 8

The system of any one of examples 1 to 7, wherein the first speed reducing ratio is larger than the second speed reducing ratio.

Example 9

The system of any one of examples 1 to 8, wherein the first motor is configured as a main motor for continuously providing driving power to the vehicle, and the second motor is configured as an assistant motor to be used when an assistant driving power is needed.

Example 10

The system of any one of examples 2 to 9, wherein the second motor is an integrated starter and generator (ISG) configured to provide the following three functions: to provide assistant driving power to the vehicle, to act as a starter of the engine, to generate electricity in a regenerative braking system of the vehicle.

Example 11

The system of any one of examples 1, 2 and 8-10, further comprising a one-way clutch disposed between the first motor and the second motor for kinematically coupling and decoupling the first motor with/from the second motor.

Example 12

The system of any one of examples 3 to 7, further comprising a one-way clutch disposed between the first motor and the second motor for kinematically coupling and decoupling the first motor with/from the second motor.

Example 13

The system of example 12, wherein the one-way clutch is disposed between the transmission sleeve and the second driving shaft; and wherein the one-way clutch is orientated in a way that allows, during the forward driving of the vehicle, the rotation speed of the transmission sleeve to be greater than that of the second driving shaft, but does not allow the rotation speed of the second driving shaft to be greater than that of the transmission sleeve, so that the torque of the second driving shaft in a forward direction can be transmitted to the transmission sleeve, while the torque of the transmission sleeve in the forward direction cannot be transmitted to the second driving shaft, thereby the power of the second motor or the powers of the second motor and the engine can be put into use by means of the one-way clutch when the vehicle is forwardly driving by the first motor and the synchronizer is kept in the neutral position.

Example 14

The system of example 13, wherein the first motor is used for recovering vehicle braking energy.

Example 15

The system of example 12, wherein the one-way clutch is disposed between the transmission sleeve and the first driving shaft; and wherein the one-way clutch is orientated in a way that allows, during the forward driving of the vehicle, the rotation speed of the transmission sleeve to be greater than that of the first driving shaft, but does not allow the rotation speed of the first driving shaft to be greater than that of the transmission sleeve, so that the torque of the first driving shaft in the forward direction can be transmitted to the transmission sleeve, while the torque of the transmission sleeve in the forward direction cannot be transmitted to the first driving shaft, thereby the power of the first motor can be put into use by means of the one-way clutch when the vehicle is forwardly driving by the second motor or by the second motor and the engine.

Example 16

The system of example 15, wherein the second motor is used for recovering vehicle braking energy.

V. Conclusion

In summary, this description describes dual-motor power systems and the dual-motor hybrid power systems for a vehicle in which a first and second motor of those power systems can share a first gear ratio gear set. This can allow for simplifying the structure of a power system and can result in reducing an overall size and a cost of the system.

Furthermore, a single synchronizer can be used in the described power systems for gear shifting of the second motor, and the first and the second motors can be disposed on opposite sides in an axial direction of the single synchronizer. During gear shifting, a motor on either side of the synchronizer can be accelerated actively, so that the speeds of the components on the two sides of the synchronizer become proximate to each other, and thus gear shifting becomes easier.

Furthermore, by using a transmission sleeve on a first driving shaft to rotatably support a second driving shaft, the first and the second driving shafts can carry each other, so that the structure strengths and transmission precisions of first and second driving shafts are increased.

Furthermore still, using the two motors as described in the example embodiments can allow for easier control of a peak torque and a greatest speed, and can provide for gear shifting without power interruption.

While certain embodiments have been described, these embodiments have been presented by way of example only, and are not intended to necessarily limit the scope of the disclosure. Those skilled in the art will understand that changes and modifications can be made to the described embodiments without departing from the true scope and spirit of the present invention, which is defined by the claims.

We claim:

1. A dual-motor power system for a vehicle, the dual-motor power system comprising:
    a first motor;
    a second motor;
    a first driving shaft configured to be turned by the first motor;
    a second driving shaft configured to be turned by the second motor and disposed to be coaxial with the first driving shaft;
    an intermediate shaft disposed to be parallel with the first driving shaft and the second driving shaft;
    a first gear set disposed between the first driving shaft and the intermediate shaft and having a first speed-reducing ratio, wherein the first gear set couples the first driving shaft with the intermediate shaft;
    a second gear set having a second speed-reducing ratio;
    a differential driven by the intermediate shaft; and
    a synchronizer disposed around the second driving shaft between the first motor and the second motor,
    wherein the synchronizer is configured to be switched between a neutral position, a first-speed-ratio position, and a second-speed-ratio position,
    wherein in the neutral position, the second driving shaft is decoupled from the first gear set and the second gear set,
    wherein in the first-speed-ratio position, the synchronizer couples the second driving shaft with the intermediate shaft via the first gear set,
    wherein, in the second-speed-ratio position, the synchronizer couples the second driving shaft with the intermediate shaft via the second gear set,
    wherein the first motor is configured as a main motor to continually provide driving power to the vehicle as the vehicle is driven, and
    wherein the second motor is configured as an assistant motor to provide additional driving power to the vehicle as the vehicle is driven.

2. The dual-motor power system as in claim 1, further comprising:
    a first sleeve fixed to the first driving shaft,
    wherein a tip end of the second driving shaft is rotatably disposed within the first sleeve, and
    wherein the first sleeve provides support of the second driving shaft.

3. The dual-motor power system as in claim 2,
    wherein the first gear set comprises a first-gear-ratio drive gearwheel and a first gear ratio driven gearwheel,
    wherein the first-gear-ratio drive gearwheel is fixedly carried by the first sleeve,
    wherein the first-gear-ratio driven gearwheel is fixed to the intermediate shaft and meshes with the first-gear-ratio drive gearwheel,
    wherein the second gear set comprises a second-gear-ratio drive gearwheel and a second gear-ratio driven gearwheel,
    wherein the second-gear-ratio drive gearwheel is carried by and rotatable relative to the second driving shaft, and
    wherein the second-gear-ratio driven gearwheel is fixed to the intermediate shaft and meshes with the second-gear-ratio drive gearwheel.

4. The dual-motor power system as in claim 3,
    wherein the synchronizer comprises an engaging sleeve, a first engagement portion, and a second engagement portion,
    wherein the engaging sleeve is carried by the second driving shaft and can be displaced in a first axial direction along the second driving shaft and in a second axial direction, opposite the first axial direction, along the second driving shaft,
    wherein the first engagement portion is provided on the first sleeve,
    wherein the second engagement portion is carried by and is rotatable relative to the second driving shaft,
    wherein the second engagement portion is connected with the second-gear-ratio drive gearwheel;
    wherein, when the synchronizer is in the neutral position, the engaging sleeve is disengaged from the first engagement portion and is disengaged from the second engagement portion,
    wherein, when the synchronizer is in the first-speed-ratio position, the engaging sleeve is engaged with the first engagement portion, and
    wherein, when the synchronizer is in the second-speed-ratio position, the engaging sleeve is engaged with the second engagement portion.

5. The dual-motor power system as in claim 4, further comprising:
    a second sleeve,
    wherein the second sleeve is carried by and is rotatable relative to the second driving shaft, and
    wherein the second engagement portion and the second-gear-ration drive gearwheel are fixed to opposite ends of the second sleeve.

6. The dual-motor power system as in claim 5,
    wherein the first sleeve includes a main body having a cylindrical shape and a central axis coinciding with a central axis of the first driving shaft,
    wherein the first sleeve includes a first end and a second end,
    wherein the first end of the first sleeve is fixed to a tip end of the first driving shaft,
    wherein the second end of the first sleeve includes an opening,
    wherein the first engagement portion is disposed on an outer periphery of the second end of the first sleeve, and
    wherein insertion of the second driving shaft within the first sleeve occurs through the opening of the second end.

7. The dual-motor power system as in claim 2, further comprising:
    a one-way clutch disposed between the first motor and the second motor for kinematically coupling the first motor with the second motor and for kinematically decoupling the first motor from the second motor.

8. The dual-motor power system as in claim 7,
    wherein the one-way clutch is disposed between the first sleeve and the second driving shaft, and wherein the one-way clutch allows, during forward driving of the vehicle, a rotation speed of the first sleeve to be greater than a rotation speed of the second driving shaft, but does not allow the rotation speed of the second driving shaft to be greater than the rotation speed of the first sleeve, so that a torque of the second driving shaft in a forward direction can be transmitted to the first sleeve, while a torque of the first sleeve in the forward direction cannot be transmitted to the second driving shaft, thereby a power of the second motor can be put into use by use of the one-way clutch when the vehicle is driven forward by the first motor and the synchronizer is kept in the neutral position.

9. The dual-motor power system as in claim 8, wherein the first motor is used for recovering vehicle braking energy.

10. The dual-motor power system as in claim 7,
wherein the one-way clutch is disposed between the first sleeve and the first driving shaft, and
wherein the one-way clutch allows, during the forward driving of the vehicle, a rotation speed of the first sleeve to be greater than a rotation speed of the first driving shaft, but does not allow the rotation speed of the first driving shaft to be greater than the rotation speed of the first sleeve, so that a torque of the first driving shaft in the forward direction can be transmitted to the first sleeve, while a torque of the first sleeve in the forward direction cannot be transmitted to the first driving shaft, thereby a power of the first motor can be put into use by use of the one-way clutch when the vehicle is driven forward by the second motor.

11. The dual-motor power system as in claim 10, wherein the second motor is used for recovering vehicle braking energy.

12. The dual-motor power system as in claim 1, further comprising:
an engine; and
a clutch configured to couple the second driving shaft to an output shaft of the engine,
wherein the dual-motor power system is configured for operation as a dual-motor hybrid power system for the vehicle.

13. The dual-motor power system as in claim 1, wherein the first speed-reducing ratio is greater than the second speed-reducing ratio.

14. The dual-motor power system as in claim 1, further comprising:
a one-way clutch disposed between the first motor and the second motor for kinematically coupling the first motor with the second motor and for kinematically decoupling the first motor from the second motor.

15. The dual-motor power system as in claim 1, further comprising:
an electronic control unit configured to (i) control a device to switch the synchronizer between the neutral position, the first speed-ratio position, and the second-speed-ratio position, (ii) switch the first motor between on and off states, (iii) switch the second motor between on and off states, (iv) switch the first motor between clockwise and counter-clockwise rotations, (v) switch the second motor between clockwise and counter-clockwise rotations, and (vi) switch a speed of the first motor, and (vii) switch a speed of the second motor.

16. A dual-motor hybrid power system for a vehicle, the dual-motor hybrid power system comprising:
a first motor including a first driving shaft;
a second motor including a second driving shaft disposed to be coaxial with the first driving shaft;
an engine disposed to be coupled with the second driving shaft via a clutch;
an intermediate shaft disposed to be parallel with the first driving shaft and the second driving shaft;
a first gear set disposed between the first driving shaft and the intermediate shaft and having a first speed-reducing ratio, wherein the first gear set couples the first driving shaft with the intermediate shaft;
a second gear set having a second speed-reducing ratio;
a differential driven by the intermediate shaft; and
a synchronizer disposed around the second driving shaft between the first motor and the second motor,
wherein the synchronizer is configured to be switched between a neutral position, a first-speed-ratio position, and a second-speed-ratio position,
wherein in the neutral position, the second driving shaft is decoupled from the first gear set and the second gear set,
wherein in the first-speed-ratio position, the synchronizer couples the second driving shaft with the intermediate shaft via the first gear set, and
wherein, in the second-speed-ratio position, the synchronizer couples the second driving shaft with the intermediate shaft via the second gear set,
wherein the first motor is configured as a main motor to continually provide driving power to the vehicle as the vehicle is driven, and
wherein the second motor is configured as an assistant motor to provide additional driving power to the vehicle as the vehicle is driven.

17. The dual-motor hybrid power system as in claim 16, wherein the second motor is arranged as an integrated starter and generator to provide assistant driving power to the vehicle, start the engine, and generate electricity in a regenerative braking system of the vehicle.

18. The dual-motor hybrid power system as in claim 16, further comprising:
an electronic control unit configured to (i) control a device to switch the synchronizer between the neutral position, the first speed-ratio position, and the second-speed-ratio position, (ii) switch the first motor between on and off states, (iii) switch the second motor between on and off states, (iv) switch the first motor between clockwise and counter-clockwise rotations, (v) switch the second motor between clockwise and counter-clockwise rotations, and (vi) switch a speed of the first motor, (vii) switch a speed of the second motor, and (viii) switch the clutch between engaged and disengaged positions.

19. A transmission for use in a dual-motor power system, the transmission comprising:
a first driving shaft configured to be turned by a first motor;
a second driving shaft configured to be turned by a second motor and disposed to be coaxial with the first driving shaft;
an intermediate shaft disposed to be parallel with the first driving shaft and the second driving shaft;
a first gear set disposed between the first driving shaft and the intermediate shaft and having a first speed-reducing ratio, wherein the first gear set couples the first driving shaft with the intermediate shaft;
a second gear set having a second speed-reducing ratio;
a differential driven by the intermediate shaft; and
a synchronizer disposed around the second driving shaft between the first motor and the second motor, wherein the synchronizer is configured to be switched between a neutral position, a first-speed-ratio position, and a second-speed-ratio position, wherein in the neutral position, the second driving shaft is decoupled from the first gear set and the second gear set, wherein in the first-speed-ratio position, the synchronizer couples the second driving shaft with the intermediate shaft via the first gear set, wherein, in the second-speed-ratio position, the synchronizer couples the second driving shaft with the intermediate shaft via the second gear set, wherein the first motor is configured as a main motor to continually provide driving power to the vehicle as the vehicle is driven, and wherein the second motor is configured as an assistant motor to provide additional driving power to the vehicle as the vehicle is driven.

* * * * *